(12) United States Patent
Mogi et al.

(10) Patent No.: US 7,500,058 B2
(45) Date of Patent: *Mar. 3, 2009

(54) CACHE MEMORY MANAGING METHOD FOR COMPUTER SYSTEM

(75) Inventors: Kazuhiko Mogi, Yokohama (JP); Norifumi Nishikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/810,462

(22) Filed: Jun. 5, 2007

(65) Prior Publication Data

US 2007/0245088 A1  Oct. 18, 2007

Related U.S. Application Data

(63) Continuation of application No. 11/443,719, filed on May 30, 2006, now Pat. No. 7,237,066, which is a continuation of application No. 10/871,838, filed on Jun. 17, 2004, now Pat. No. 7,096,319.

(30) Foreign Application Priority Data

Mar. 31, 2004 (JP) .............................. 2004-102111

(51) Int. Cl.
*G06F 12/00* (2006.01)

(52) U.S. Cl. ................. 711/129; 711/153; 711/170; 711/173; 707/1; 707/100

(58) Field of Classification Search ................. 711/118, 711/119, 128, 129, 153, 171, 173; 707/1, 707/100

See application file for complete search history.

(56) References Cited

U.S. PATENT DOCUMENTS

| | | | |
|---|---|---|---|
| 6,549,920 B1* | 4/2003 | Obara et al. ................. 707/204 |
| 6,615,317 B2* | 9/2003 | Roseborough et al. ...... 711/129 |
| 2003/0093647 A1* | 5/2003 | Mogi et al. ..................... 712/1 |
| 2004/0049636 A1* | 3/2004 | Campbell et al. ............ 711/130 |
| 2004/0054648 A1* | 3/2004 | Mogi et al. ..................... 707/1 |
| 2004/0193658 A1* | 9/2004 | Kawamura et al. .......... 707/202 |

* cited by examiner

*Primary Examiner*—Jasmine Song
(74) *Attorney, Agent, or Firm*—Townsend and Townsend and Crew LLP

(57) ABSTRACT

A computer system acquires mapping information of data storage regions in respective layers from a layer of DBMSs to a layer of storage subsystems, grasps correspondence between DB data and storage positions of each storage subsystem on the basis of the mapping information, decides a cache partitioning in each storage subsystem on the basis of the correspondence and sets the cache partitioning for each storage subsystem. When cache allocation in the DBMS or the storage subsystem needs to be changed, information for estimating the cache effect due to the change in cache allocation acquired by the DBMS is used for estimating the cache effect in the storage subsystem.

16 Claims, 14 Drawing Sheets

FIG.6

| PARTITIONED-CACHE ID | C0 | C1 | ... | 332 |
| --- | --- | --- | --- | --- |
| CACHE CAPACITY | 1024MB | 512MB | ... | 334 |
| STORAGE REGION NAME | R1 | R2 | ... | 324 |
| DB OBJECT NAME | - | I1 | ... | 322 |
| EXCLUSIVE CONTROL MODE | On | On | ... | 336 |

330 PARTITIONED-CACHE SETTING INFORMATION

FIG.7

| CACHE-GROUP ID | CGrp0 | CGrp1 | ... | 412 |
|---|---|---|---|---|
| CACHE CAPACITY | 1024MB | 2048MB | ... | 334 |
| LU ID | LU0,LU2,LU3... | LU1 | ... | 414 |
| CONTROL MODE SETTING | Normal | Exclusive | ... | 416 |

CACHE-GROUP INFORMATION 410

FIG.8

| PARTITIONED-CACHE ID | | CID1 | CID2 | ... | |
|---|---|---|---|---|---|
| CUMULATIVE NUMBER | | 168799 | 489789 | ... | 514 |
| CUMULATIVE NUMBER OF HITS | ACTUAL HIT | 48958 | 389072 | ... | |
| | FIRST SECTION | 342 | 1890 | ... | |
| | SECOND SECTION | 6869 | 97898 | ... | 516 |
| | ⋮ | ⋮ | ⋮ | ⋮ | |
| | M-TH SECTION | 4789 | 57 | ... | |

332 — PARTITIONED-CACHE ID row

510: CACHE MONITOR INFORMATION

CACHE MEMORY MANAGING METHOD FOR COMPUTER SYSTEM

INCORPORATION BY REFERENCE

The present application claims priority from Japanese application JP2004-102111 filed on Mar. 31, 2004, the content of which is hereby incorporated by reference into this application.

BACKGROUND OF THE INVENTION

The present invention relates to management of a computer system and particularly to a method for setting and managing cache memories in a computer system on which a database management system (hereinafter referred to as "DBMS") operates.

Most of application programs executed by a computer system use a database (hereinafter referred to as "DB"). Accordingly, performance of the DBMS which is a software used to manage the data processing to the DB and maintain the data of the DB is very important to the computer system. The performance of the DBMS is significantly affected by data access performance to the data stored on the storage subsystem. For this reason, in the computer system, improvement of data access performance to the storage subsystem leads to improvement in performance of the DBMS.

Generally, in order to improve access performance, the storage subsystem including a large number of hard disk drives has a semiconductor memory which is utilized as a cache memory. The storage subsystem holds a part of data originally stored in the hard disk drives in the cache memory. The read requests to the data in the cache memory will complete immediately because there is no need to read the data from the hard disk drives which takes a lot of time (hereinafter this state being referred to as "read hit state" or "hit state"). This improves the access performance to the storage subsystem largely. The quantity of data utilized by a computer system has been increasing recently. The capacity ratio of the cache memory relative to the quantity of data has been decreasing with the advance of increase in the quantity of data. Therefore, it is very important to utilize the finite capacity of the cache memory effectively in order to improve access performance to the storage subsystem.

With respect to improvement in efficiency in use of a cache memory in general, there is known the following background art.

A technique has been disclosed in U.S. Pat. No. 5,434,992. In the technique, a LRU (Least Recently Used) replacement algorithm is used in a storage subsystem. When a cache memory is partitioned and allocated in accordance with the kinds of data, information indicating positions of data in an LRU management list at the time of data hit is acquired. The number of hits when allocation of the cache memory in accordance with the kinds of data is changed is estimated on the basis of the information. Allocation of the cache memory in accordance with the kinds of data is controlled on the basis of the estimated value of the number of hits. In this specification, "number of hits" is defined as the number of accesses hit in the cache memory among accesses to a predetermined storage region in a suitably decided period. "Hit ratio" is defined as a value obtained by dividing the number of hits by the total number of accesses to the storage region in the same period.

A technique has been disclosed in "Oracle9i Database Daily Feature—Oracle9i Memory Management". The technique concerns a memory included in a computer on which a DBMS is executed. In the technique, the DBMS predicts change in number of data input/output (hereinafter referred to as "I/O") to/from a storage subsystem (that is, change in hit ratio of the memory) in the case where the capacity of a cache memory held in the memory is changed.

A technique has been disclosed in "My cache or yours? Making storage more exclusive" (USENIX Annual Technical Conference pp. 161-175, June 2002). In the technique, a storage subsystem does not use a cache memory at ordinary read access so that the storage subsystem stores only data designated by a computer in the cache memory.

SUMMARY OF THE INVENTION

It is conceived that the storage subsystem can use the cache memory more efficiently when the technique disclosed in U.S. Pat. No. 5,434,992 is combined with the technique disclosed in "My cache or yours? Making storage more exclusive". When these techniques are used in combination, with respect to cache partitioning disclosed in U.S. Pat. No. 5,434,992, it is necessary to consider correspondence in cache partitioning between the computer and the storage subsystem.

Moreover, cache memory allocation control (hereinafter referred to as "cache allocation") disclosed in "My cache or yours? Making storage more exclusive" needs to be carried out both on the computer and on the storage subsystem. In this case, particularly the way how the cache memory is partitioned in the computer must be considered in order to control cache allocation in the storage subsystem.

To take the cache allocation into consideration for the computer system, an aspect of the invention has the following configuration. That is, a computer system has: computers on which database management systems operate respectively; storage subsystems connected to the computers and provided for storing data of databases managed by the database management systems; and a management device connected to the computers and the storage subsystems. In this configuration, each of the computers includes a first cache memory while each of the storage subsystems includes a second cache memory.

The management device acquires information concerning partitioning of the first cache memory from the database management systems, acquires information concerning mapping of data from the computers and the storage subsystems respectively, decides a second cache memory partitioning method in the storage subsystems by using the information about partitioning of the first cache memory and the information about mapping of data and instructs the storage subsystems to set partitioning of the second cache memory in accordance with the decided partitioning method.

It may be configured that the management device receives information of the expected quantity of change in the first cache memory or the second cache memory, collects information about cache hit ratios of the first cache memory and the second cache memory from the computers and the storage subsystems and predicts cache hit ratios in respective cache memories in the computer system after change in the capacity of the cache memory on the basis of these information. Moreover, the management device may instruct the computers and the storage subsystems to change the capacity of the cache memory on the basis of a result of the prediction.

Furthermore, the management device may predict cache hit ratios of the cache memory while the first cache memory and the second cache memory are regarded as one virtual cache memory.

Moreover, in each of the computers, the first cache memory is partitioned and allocated to data in accordance with the kinds of data used in the database. In this case, the management units for storage region management, to which some kind of data belong, may be introduced and the cache memory is partitioned according to them. The management device partitions the storage region of the storage subsystems into groups by the kinds of data to be stored or by the management units for storage region management. Accordingly, the management device controls the storage subsystems so that the second cache memory is partitioned by the groups so as to be allocated to the groups. It may be configured the management device associates the regions of the first cache memory allocated in accordance with the kinds of data with the regions of the second cache memory and sends commands to set predetermined mode to the computers and the storage subsystems so that the first and second cache memories cooperate with each other for cache memory operation.

The following configuration may be conceived. First, with respect to setting of cache partitioning with good correspondence between the DBMS and the storage subsystem, mapping information of data storage regions in respective layers of from a layer of DBMSs to a layer of storage subsystems is acquired. Correspondence is grasped on the basis of the acquired information. A cache partitioning method in each storage subsystem is decided. The decided method is set for the storage subsystem.

With respect to prediction of the cache effect in the storage subsystem at the time of change in cache allocation, information for estimating the effect due to change in cache allocation acquired by the DBMS can be used for predicting the cache effect.

BRIEF DESCRIPTION OF THE DRAWINGS

FIG. 6 is a table showing an example of data structure of partitioned-cache setting information 330;

FIG. 7 is a table showing an example of data structure of cache-group information 410;

FIG. 8 is a table showing an example of data structure of cache monitor information 510;

DESCRIPTION OF THE EMBODIMENTS

In the invention, a management computer acquires mapping information of a storage region in each layer from a computer for executing a DBMS to a storage subsystem to make it easy to set cache partitioning with good correspondence between the computer for executing the DBMS and the storage subsystem. The management computer grasps the correspondence between a storage region in the computer for executing the DBMS and a storage region in the storage subsystem on the basis of the mapping information. Then, the management computer decides a cache partitioning method for the computer and the storage subsystem on the basis of the grasped correspondence and sets cache partitioning for the computer and the storage subsystem. The management computer predicts the hit ratio in the storage subsystem by using information for estimation of an effect due to change of cache allocation acquired by the DBMS so that the cache memory hit ratio in the storage subsystem can be predicted even in the case where cache allocation in the computer for executing the DBMS is changed. Furthermore, the following description is for an embodiment of the invention and it is a matter of course that the invention includes a configuration equivalent to the following description.

Figure 1:
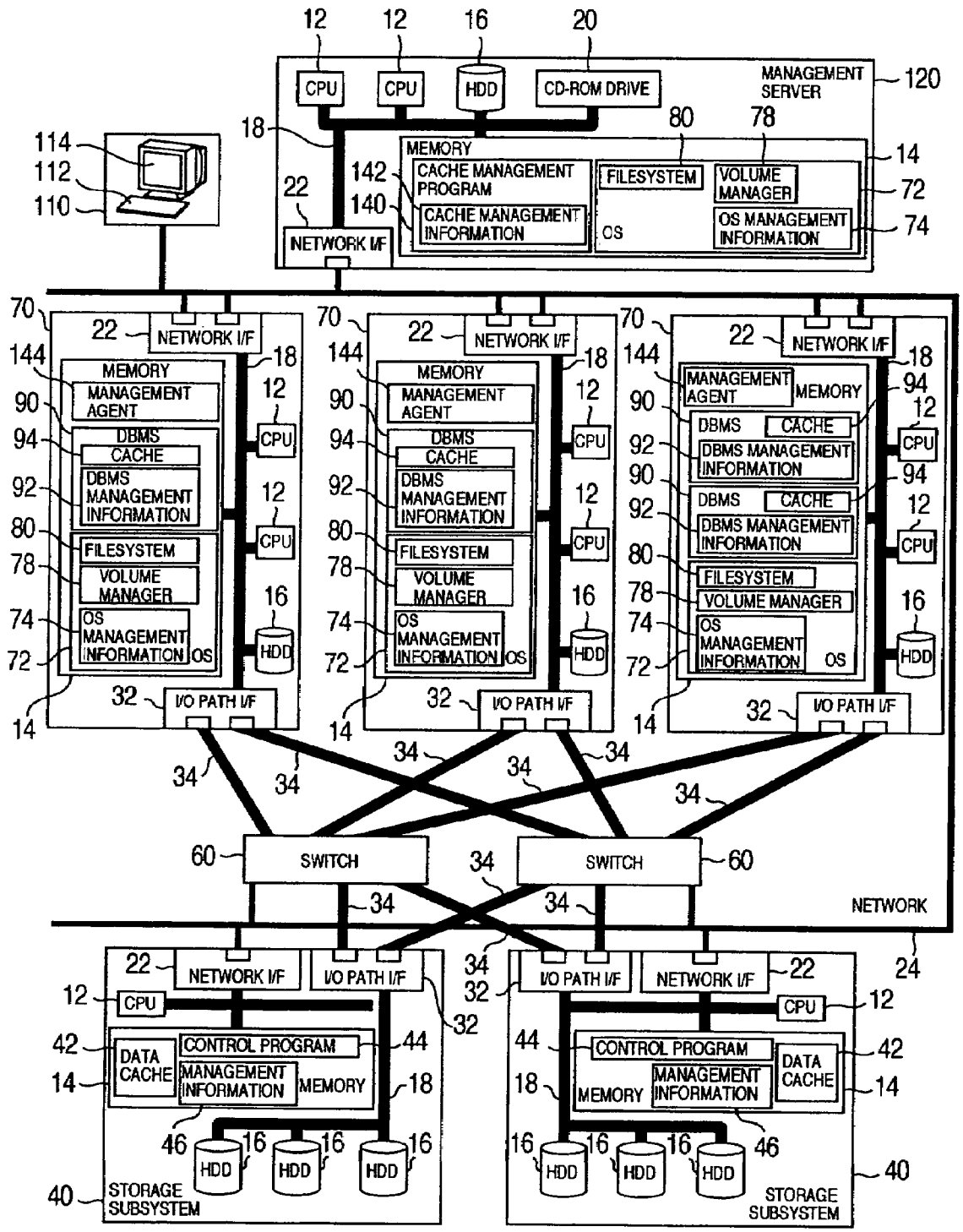
FIG. 1 is a diagram showing an example of configuration of a computer system according to Embodiment 1 of the invention.
Figure 2:
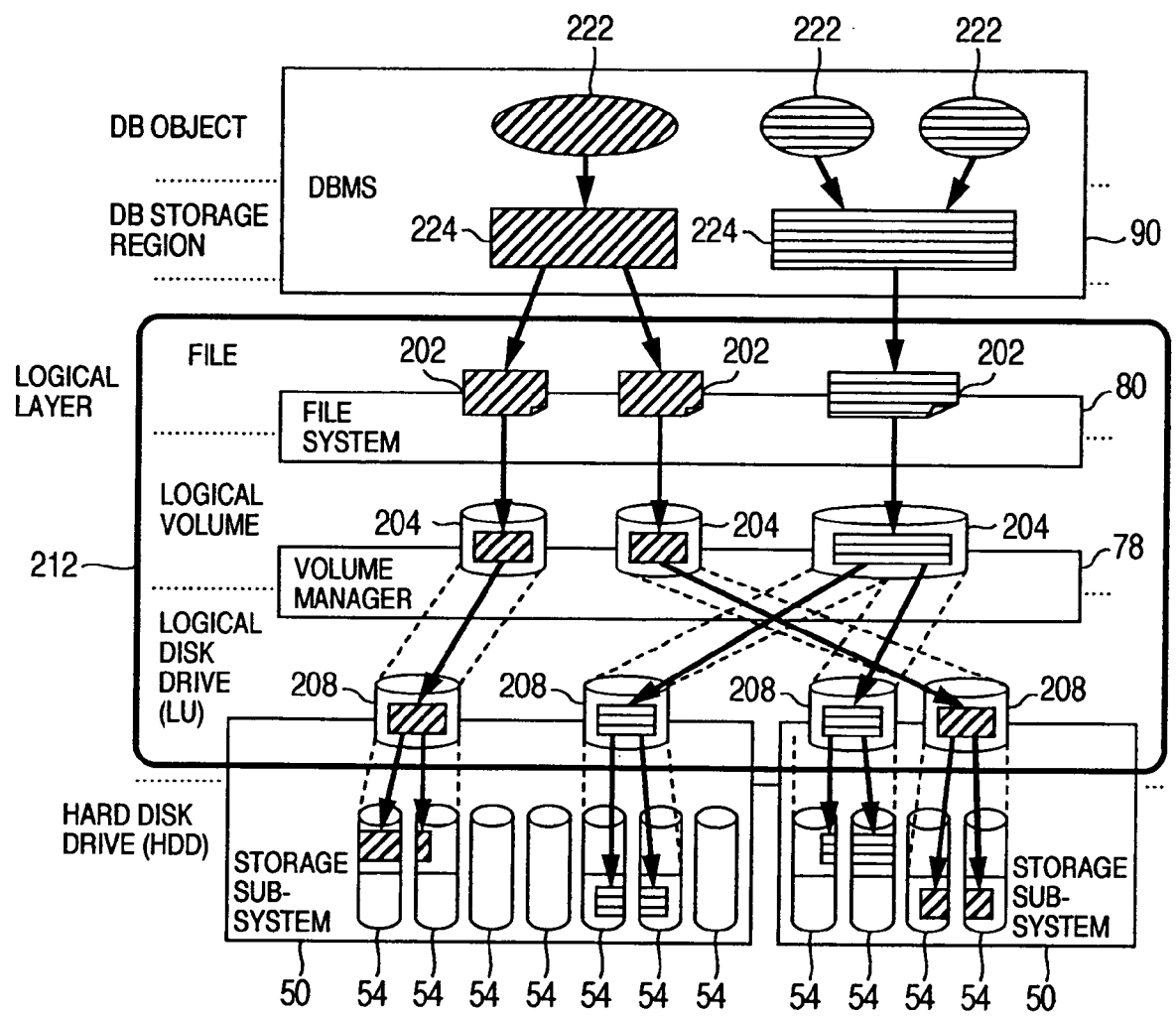
FIG. 2 is a diagram showing an example of hierarchical configuration of data mapping of data managed by a DBMS 90.

FIG. 1 is a diagram showing an example of configuration of a computer system according to Embodiment 1 of the invention. FIG. 2 is a diagram showing an example of hierarchical configuration of data mapping of data managed by a DBMS 90. The computer system has storage subsystems 40, computers (hereinafter referred to as "servers") 70 using the storage subsystems 40, and a computer (hereinafter referred to as "management server") 120 for managing cache memories in the computer system. The devices include network I/Fs 22 respectively. The devices are connected to a network 24 through the network I/Fs 22 so that the devices can communicate with one another.

The servers 70 and the storage subsystems 40 include I/O path I/Fs 32 respectively. The I/O path I/Fs 32 are connected to switches 60 through communication lines (hereinafter referred to as "I/O paths") 34. I/O processing between the servers 70 and the storage subsystems 40 is performed through the I/O paths 34 and the switches 60. Furthermore, communication lines for transferring data between the devices by using a different physical medium or a different protocol may be used as the I/O paths 34. In this case, the switches 60 may convert various kinds of protocols. The network 24 may be constituted by the same communication line as the I/O paths 34.

Each of the storage subsystems 40 includes a CPU 12, a memory 14, at least one hard disk drive (hereinafter referred to as "HDD") 16, a network I/F 22, and an I/O path I/F 32. These constituent members of each storage subsystem 40 are connected to one another by an internal bus 18. A single HDD 16 may be used or a plurality of HDDs 16 may be used. The memory 14 has an ROM region, and an RAM region.

A control program 44 which is a program for controlling each storage subsystem 40 is stored in the ROM region of the memory 14. The control program 44 is transferred to the RAM region at the time of start and executed by the CPU 12. A part of the memory 14 is allocated as a cache memory (hereinafter also referred to as "data cache") 42 which is a region for temporarily storing data corresponding to an access request from an external device. The storage subsystem 40 performs various kinds of processing by executing the control program 44. The control program 44 stores management information 46 used for controlling and managing the storage subsystem 40 is held on the memory 14. The management information 46 contains region mapping information 310 and cache-group information 410 which will be described later.

Each of the storage subsystems 40 generates at least one logical disk drive (hereinafter referred to as "logical unit" or "LU") 208 on the basis of the physical storage regions of the HDDs 16 and provides the LU 208 to an external device. The LU 208 may correspond to one HDD 16 or may correspond to a physical storage region constituted by a plurality of HDDs 16. Or one HDD 16 may correspond to a plurality of LUs 208. Information concerning the correspondence between LUs 208 and HDDs 16 is held as the region mapping information 310 contained in the management information 46.

The storage subsystem 40 can send information held in the management information 46 to an external device (e.g. management server 120 etc.) through the network 24 in accordance with a request from the external device. Further, the storage subsystem 40 can execute change in setting of cache-groups in the storage subsystem 40, setting of various kinds of processing performed by the storage subsystem 40 and the various kinds of processing, as will be described later, in accordance with instructions received from an external device through the network 24.

Each of the servers 70 includes at least one CPU 12, a memory 14, an HDD 16, a network I/F 22, and an I/O path I/F 32. The constituent members of each server 70 are connected to one another by an internal bus 18. An operating system (OS) 72 and a management agent 144 are read from the HDD 16 onto the memory 14. The OS 72, etc. read thus are executed by the CPU 12.

The OS 72 is a program set executed by the computer for performing basic processing such as program execution control or hardware control. The OS 72 contains a volume manager 78, and a filesystem 80. The OS 72 holds OS management information 74 which is management information used by the program set constituting the OS 72. The OS management information 74 contains information concerning the hardware configuration of the server 70. The OS 72 has a software interface through which information stored in the OS management information 74 is provided to another program. Although FIG. 1 shows the case where each server 70 includes only one filesystem 80, each server 70 may include a plurality of filesystems 80.

The volume manager 78 is a program which is executed when the server 70 generates a logical volume 204 on the basis of the storage region of the LU 208 provided by each storage subsystem 40 and provides the logical volume 204 to the filesystem 80. Information concerning the correspondence between the LU 208 and the logical volume 204 is held in the region mapping information 310 contained in the OS management information 74.

The filesystem 80 is a program which is executed when the server 70 generates a file 202 on the basis of the storage region of the LU 208 provided by each storage subsystem 40 or the storage region of the logical volume 204 and provides the file 202 to another program. Information concerning the correspondence between the LU 208 or the logical volume 204 and the file 202 is held in the region mapping information 310 contained in the OS management information 74. In the following description, it is assumed that a raw device function provided for gaining direct access to the storage region of the logical volume 204 or the LU 208 and formed as a software interface the same as in access to the file 202 is achieved by the filesystem 80.

The management agent 144 is a program which is executed when a processing request accepted from a cache management program 140 executed on the management server 120 through the network 24 is executed by the server 70 and a result of the processing request is sent back to the cache management program 140 through the network 24 according to necessity. Processing executed by the management agent 144 contains (1) reading information included in the OS management information 74, (2) reading information included in the DBMS management information 92, and (3) instructing the DBMS 90 to perform setting concerning the cache 94.

The DBMS 90 is a program which is executed when the server 70 executes processing and management concerning the DB. This program is read from the HDD 16 or the storage subsystem 40 onto the memory 14 and executed by the CPU 12. The DBMS 90 keeps a cache memory region (hereinafter referred to as "cache") 94 on the memory 14. The DBMS 90 holds DB data used in processing in the cache 94. Although each program may be used as a subject in this specification, the CPU executing the program actually executes processing.

The DBMS 90 has DBMS management information 92 which is information for managing the DBMS 90. The DBMS management information 92 contains data storage region information 320, partitioned-cache setting information 330, cache monitor information 510, and file I/O monitor information 530. The DBMS 90 has a software interface through which information contained in the DBMS management information 92 is provided to an external program or various kinds of function settings of the DBMS 90 are set. A plurality of DBMSs 90 can be executed simultaneously on one server 70.

The DBMS 90 stores tables, indices, logs, etc. (hereinafter generically referred to as "DB object" 222) used and managed by the DBMS 90 per se are stored in the storage subsystem 40. The tables, indices, logs, etc. may be partitioned into a plurality of DB objects 222 in accordance with a condition such as the attribute value of a certain attribute. The DBMS 90 generates a DB storage region 224, which is a management unit for storage region management, by using the file 202 provided by the filesystem 80. The DBMS 90 manages the storage region by using the DB storage region 224. At least one DB object 222 is allocated to the DB storage region 224. Management information for managing the correspondence between the DB storage region 224 and the DB object 222 is held as data storage region information 320 contained in the DBMS management information 92.

The OS 72, the DBMS 90 and the management agent 144 are read from a removable storage medium (such as a CD-ROM) in which these programs are stored, by use of a CD-ROM drive 20 of the management server 120 and installed in the HDD 16 of the server 70 or the storage subsystem 40 through the network 24.

The management server 120 includes at least one CPU 12, a memory 14, an HDD 16, a CD-ROM drive 20, and a network I/F 22. The constituent members of the management server 120 are connected to one another by an internal bus 18. An OS 72 and a cache management program 140 are read from the HDD 16 onto the memory 14 and executed by the CPU 12. The CD-ROM drive 20 is used for installing various kinds of programs.

A management terminal 110 is connected to the management server 120 through the network 24. The management terminal 110 includes input devices 112 such as a keyboard, a mouse, etc., and a display screen 114. The management server 120 and the management terminal 110 may be connected to each other by a communication line different from the network 24 or may be integrated with each other. As a general rule, an administrator performs input/output of information and control instructions through the management terminal 110 and uses the CD-ROM drive 20, etc. if necessary.

The cache management program 140 is a program which is executed when the management server 120 manages the cache 94 of the server 70 and the data cache 42 of the storage subsystem 40. The cache management program 140 is read from the HDD 16 onto the memory 14 and executed by the CPU 12. The cache management program 140 has cache management information 142 which is management information necessary for managing the cache 94, etc. The cache management program 140 is read from a CD-ROM by the CD-ROM drive 20 of the management server 120 and installed in the HDD 16.

The cache management program 140 acquires various kinds of information from other devices and gives instruction to execute setting and processing concerning the cache. On this occasion, the cache management program 140 instructs the storage subsystem 40 through the network 24 to execute setting and processing so that a necessary process can be carried out. The cache management program 140 instructs the management agent 144 through the network 24 to process the program executed on the server 70.

The cache management program 140 acquires region mapping information 310 held in the storage subsystem 40, the volume manager 78 and the filesystem 80 (hereinafter generically referred to as "virtualization mechanism"), data storage region information 320 from the DBMS 90 and cache-group information 410 from the storage subsystem 40 and stores these kinds of information as collective mapping information together with identifiers of source devices/programs in the cache management information 142.

The cache management program 140 uses a certain specific cache group as a "free cache group" whose allocated capacity of cache memory is to be reduced preferentially at adjustment of cache allocation to manage cache-groups of the storage subsystem 40. Particularly, LUs 208 free from a cache allocating request (in a default state or not allocated to the data cache 42) are controlled to belong to a free cache group. The cache-groups and cache group information 410 will be described later.

FIG. 2 is a diagram showing an example of hierarchical configuration of correspondence (hereinafter referred to as "data mapping") of data managed by the DBMS 90 in Embodiment 1. When there are certain two layers, a layer near the DBMS 90 is hereinafter referred to as an upper layer whereas a layer near the HDD 16 is hereinafter referred to as a lower layer. Files 202, logical volumes 204 and LUs 208 are generically referred to as "virtualized storage objects". The virtualized storage object and HDDs 16 are generically referred to as "managed storage objects". A layer interposed between virtualized storage objects is referred to as logical layers 212.

DB Objects 222 are stored in DB storage regions 224. Each DB storage region 224 is associated with (hereinafter also referred to as "mapped in") at least one file 202. A plurality of DB storage regions 224 may be mapped in different regions of one file 202. For access to data, the DBMS 90 makes access to a file 202 corresponding to the DB storage region 224.

The filesystem 80 converts access to the file 202 into access to a logical volume 204 corresponding to the file 202. The volume manager 78 converts access to the logical volume 204 into access to an LU 208 corresponding to the logical volume.

The storage subsystem 40 converts access to the LU 208 into access to an HDD 16 corresponding to the LU 208. In this manner, the virtualization mechanism maps virtualized storage object data provided to an upper layer by the virtualization mechanism in (all or part of) at least one managed storage object storage region in a lower layer. Furthermore, a plurality of routes may be provided as mapping routes between the DB storage region 224 and the LU 208.

In this embodiment, the volume manager 78 need not be used in the server 70 as long as correspondence of data between managed storage objects can be made clear in the logical layers 212. The number of layers providing virtualized storage objects may be increased. For example, virtualization switches may be used in place of the switches 60 so that the virtualization switches can virtualize the storage regions of LUs 208 provided by the storage subsystems 40 to thereby generate virtual volumes. In this system configuration the servers 70 recognize the virtual volumes. In this case, a layer of virtual volumes is interposed between the layer of logical volumes 204 and the layer of LUs 208 in the logical layers 212. The virtualization switches hold region mapping information 310 for managing the configuration of the virtual volumes. The cache management program 140 also acquires the mapping information 310 from the virtual switches. Accordingly, this embodiment can be applied because the cache management program 140 can grasp the correspondence of data in the logical layers 212 even in the case where the virtualization switches are used.

Exclusive use control of the data cache 42 and the cache 94 in this embodiment will be described below. Although the filesystem 80 can be formed to have a cache, this embodiment shows the case where the cache of the filesystem 80 is not used (present) because a raw device mechanism or the like is used.

Each storage subsystem 40 classifies the storage regions into groups in accordance with the LUs 208. The storage subsystem 40 allocates the data cache 42 to independent regions in accordance with the groups. The groups of LUs 208 are hereinafter referred to as "cache groups". Information concerning the configuration of the cache groups is held in cache-group information 410 contained in the management information 46. The storage subsystem 40 can dynamically perform generation and deletion of each cache-group and addition and deletion of LUs 208 belonging to each cache-group. The term "dynamically" means "without interruption of any other processing". The storage subsystem 40 can dynamically change allocation of the data cache 42 to the cache-groups. Furthermore, as described above, there may be provided a cache-group to which the data cache 42 is not allocated (or which uses a remaining region except allocated regions). This is a free cache-group as described above.

The storage subsystem 40 can change a processing method (hereinafter referred to as "control mode") for replacing data stored in the data cache 42 in accordance with the cache-groups. The storage subsystem 40 holds information of the control mode set for each cache-group as control mode setting information 416 contained in the cache-group information 410. The following control modes are used. One is a "normal" mode in a default state. In this mode, the storage subsystem 40 replaces data stored in the data cache 42 on the basis of general LRU replacement algorithm (purging of data from the data cache is managed in LRU order). The other is an "exclusive" mode. In this mode, the storage subsystem 40 performs data replacement control so as to be utilized by the cache 94 of the DBMS 90 and the data cache 42 of the storage subsystem 40 exclusively.

Specifically, the data replacement method in the exclusive mode is as follows. The exclusive mode is basically the data replacement control based on LRU replacement algorithm. Further, in the exclusive mode, the following control is performed with respect to data read into each server 70, the storage subsystem 40 discards data read from the data cache 42 after completion of processing. Or the storage subsystem 40 transits read data to an LRU state in management information in LRU replacement algorithm, that is, to a state in which the cache region can be re-used most easily.

Further, in the exclusive mode, when a data caching request is accepted from the server 70, the storage subsystem 40 reads requested data into the data cache 42 and transits the read data to an MRU (Most Recently Used) state, that is, to a state in which the period of data caching becomes the longest at that point of time. Further, the server 70 may send data as a subject of the caching request, in addition to the caching request, to the storage subsystem 40. In this case, the storage subsystem 40 need not read the requested data from the HDD 16 into the data cache 42.

Further, the server 70 embeds information (hereinafter referred to as "hint information") indicating that data to be written should stay in the data cache 42 (hereinafter referred to as "data caching"), in a data write request regardless of the control mode used in the storage subsystem 40. Upon reception of the hint information-including write request, the storage subsystem 40 transits the data which should be cached on the basis of the hint information, to an MRU state when the control mode of the cache-group containing the LU 208 in which the write data should be written is an exclusive mode.

Upon reception of an ordinary write request without hint information, the storage subsystem 40 transits the written data to an LRU state (or a state near the LRU state) when a corresponding cache group is set in an exclusive mode. Furthermore, for the sake of simplification of write control, there may be used a control method in which the storage subsystem 40 transits all data as a subject of the write request to an MRU state without use of hint information.

On the other hand, the DBMS 90 partitions the storage region of the cache 94 in accordance with the DB objects 222 or the DB storage regions 224. The partitioned storage regions of the cache 94 are referred to as "partitioned-caches". The DBMS 90 performs data replacement control by using LRU replacement algorithm in each partitioned-cache.

When a cache group containing an LU 208 storing an DB object 222 corresponding to a certain partitioned-cache is in an exclusive mode, that is, when exclusive control can be executed, the DBMS 90 sets the value of corresponding exclusive control mode setting information 334 contained in the partitioned-cache setting information 330 at "On". Whereas, the default value of exclusive control mode setting information 334 is set at "Off". The exclusive control mode setting information 334 is information indicating the way of control for discarding data from the partitioned-cache of the cache 94. When the value of the exclusive control mode setting information 334 is "On", the DBMS 90 performs the following processing for discarding data from the cache 94.

When data to be discarded has been already written in the storage subsystem 40, the DBMS 90 issues a data caching request to the storage subsystem 40 so that the data to be discarded can stay in the data cache. On the other hand, when data to be discarded has not been written in the storage subsystem 40 yet, the DBMS 90 issues a hint information-including write request to the storage subsystem 40. However, when write control is simplified in the storage subsystem 40, the DBMS 90 uses an ordinary write request.

When the cache is partitioned so as to be used efficiently, it is better that data different in access characteristic are allocated to different storage regions. In the cache 94 of the DBMS 90 in this embodiment, at least data belonging to different DB storage regions 224 are allocated to different partitioned-caches respectively. In the method of managing the storage regions in the DBMS 90 according to this embodiment, it is impossible to control the storage regions with resolution higher than that of the DB storage regions 224. On the other hand, the cache groups in the storage subsystem 40 are set based on the LUs 208. That is, it is conceived that when the LUs 208 are set to have one-to-one correspondence with the DB storage regions 224, the caching efficiency improving effect due to the setting of the cache groups in the storage subsystem 40 (external control of the capacity of the cache used by specific data) can be maximized.

Next, a method of estimating the number of cache hits at the time of changing cache capacities in this embodiment will be described. It is assumed that, before the number of cache hits is estimated, cache allocation for both the partitioned-cache and the region (hereinafter referred to "cache-group cache") of the data cache 42 allocated to cache groups concerning the estimation of the number of cache hits after changing of cache capacities thereof are given from the administrator to the management server 120 in advance.

When the aforementioned cache control is executed, in the exclusive mode, data to be discarded from the cache 94 of the DBMS 90 stays in the data cache 42 of the storage subsystem 40. In this embodiment, data replacement control based on the LRU replacement algorithm is performed on both the cache 94 and the data cache 42. Accordingly, when partitioned-caches in the cache 94 have one-to-one correspondence with cache-group caches in the data cache 42, a partitioned-cache and a cache-group cache having one-to-one correspondence with each other can be regarded as one large cache memory managed by LRU replacement algorithm. In this case, one partitioned-cache may correspond to the whole of the cache 94 or one cache-group cache may correspond to the whole of the data cache 42.

When this condition holds, the number of cache hits in a corresponding cache-group cache at the time of changing allocation of a partitioned-cache for the DB storage region 224 can be estimated as follows.

As described above, two caches corresponding to each other can be regarded as a large cache (hereinafter referred to as "virtual cache") managed by LRU replacement algorithm. Therefore, virtual management information (virtual LRU management list 5000) having a format which can be used in LRU replacement algorithm is provided in the DBMS 90 in order that the DBMS 90 can manage the virtual cache. One virtual LRU management list 5000 has so many entries that a larger quantity of data than the quantity of data allowed to be actually cached can be managed in order to estimate the number of cache hits when the cache capacity allocated to partitioned-caches is increased. In this embodiment, the DBMS 90 holds virtual LRU management lists 5000 according to each partitioned-cache. The DBMS 90 can use the virtual LRU management list 5000 for the data replacement control performed on partitioned-caches by LRU replacement algorithm also.

The method of estimating the number of cache hits at the time of changing of cache capacity to partitioned caches by use of the virtual LRU management list 5000 will be described below in connection with comparison between those before and after reduction in allocation of the cache capacity (hereinafter referred to as "cache allocation") to partitioned-caches.

Figure 3:
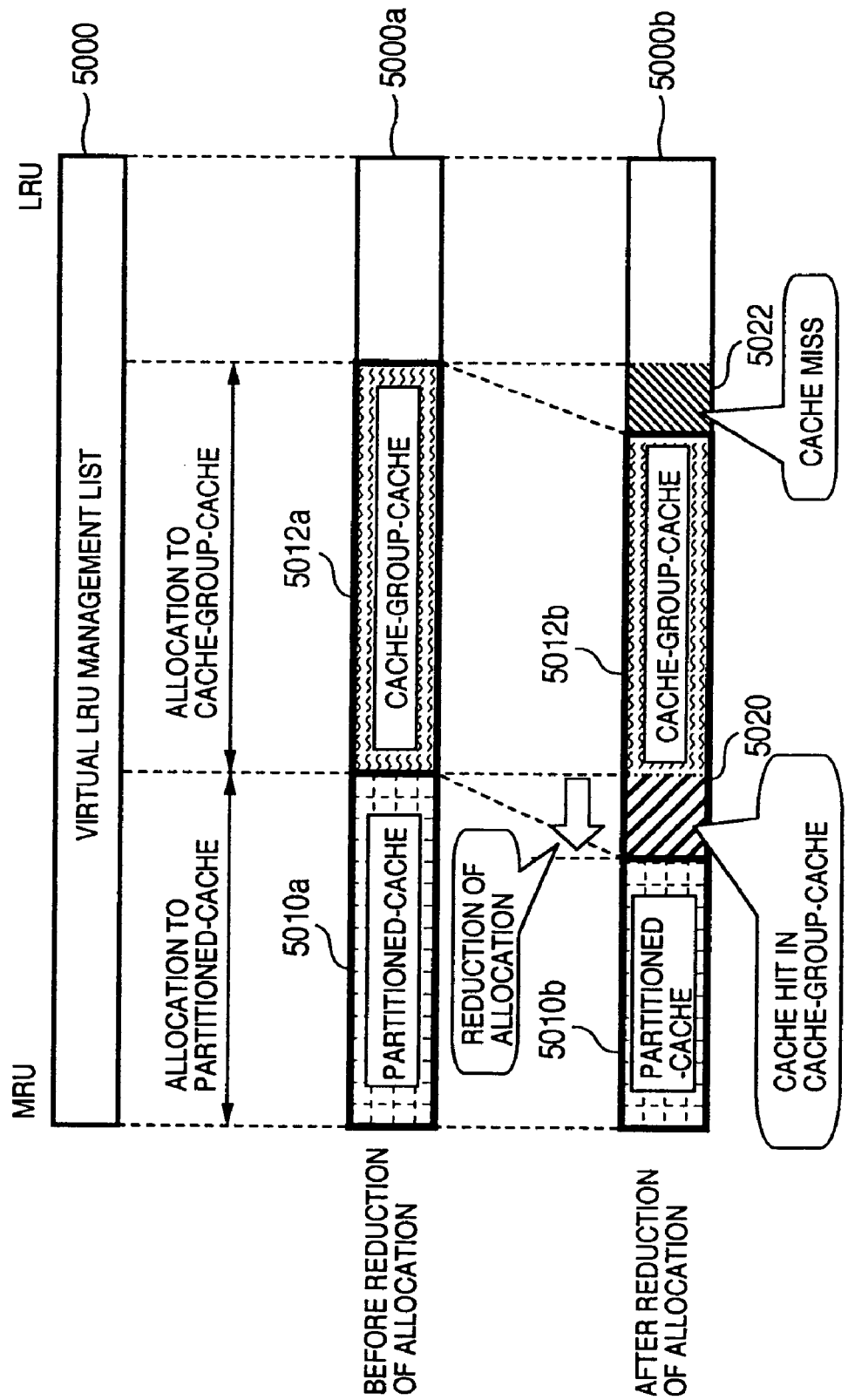
FIG. 3 is a diagram showing an example of an entry position in a virtual LRU management list 5000 and change in place where data managed in the virtual LRU management list 5000 stays when allocation to partitioned-cache is reduced.

FIG. 3 is a diagram showing an example of change in entry position in the virtual LRU management list 5000 and change in place (partitioned-cache or cache-group cache) where data managed in the virtual LRU management list 5000 stays, when cache allocation to the partitioned cache is reduced. The one virtual LRU management list 5000a shows a state before reduction in cache allocation. The virtual LRU management list 5000b shows a state after reduction in cache allocation. Data which stays in the partitioned-cache corresponds to a region (region 5010a or 5010b) located at the MRU side of the virtual LRU management list 5000. Data which stays in the cache-group cache corresponds to a region (region 5012a or 5012b) continued from the region 5010a or 5010b.

That is, if the distribution of the number of cache hits in each position in the virtual LRU management list can be found, the number of cache hits can be estimated as the sum of values in portions corresponding to the aforementioned mapping. With respect to reduction in cache allocation to the partitioned-cache, data which is hit when its corresponding entry stays in a region 5020 of the virtual LRU management list 5000b equivalent to reduction in cache allocation to the partitioned-cache is hit in the partitioned-cache (cache 94) before the reduction, but will become to be hit in the cache-group cache (data cache 42) after the reduction. Data which is hit when its corresponding entry stays in region 5022, shifted according to reduction in cache allocation, are hit in the cache-group cache (data cache 42) before the reduction, but will become not to be hit (hereinafter also referred to "missed") after the reduction.

This method can be applied not only to reduction in cache allocation to the partitioned-cache but also to reduction/enlargement in cache allocation to the partitioned-cache and the cache-group cache. For example, for enlargement in cache allocation to the partitioned-cache, the virtual LRU management list 5000b shows a state before enlargement in cache allocation to the partitioned-cache whereas the virtual LRU management list 5000a shows a state after the enlargement.

There has been described the case where the partitioned-caches in the cache 94 have one-to-one correspondence with the cache-group caches in the data cache 42. This condition may not hold in a certain case. Even in that case, in consideration of the way of holding the virtual LRU management list 5000, the number of cache hits in the partitioned-caches can be estimated directly from the virtual LRU management list 5000 in the same manner as in the case where the partitioned-caches have one-to-one correspondence with the cache-group caches. In this case, the number of cache hits in the cache-group caches is estimated as follows.

When a plurality of partitioned-caches correspond to one cache-group cache, the number of cache hits in the cache-group cache is estimated as follows.

(a-1) On the target cache-group cache, the number of accesses of data corresponding to each partitioned-cache is grasped. The number of accesses is calculated by subtracting an estimated value of the number of hits in the partitioned-cache from a monitored value of the number of times in reference to data corresponding to the partitioned-cache.

(a-2) The capacity of the cache currently allocated as the cache-group cache is divided to each partitioned-cache proportionally to the number of accesses calculated by the step (a-1).

(a-3) The number of cache hits is estimated by use of the divided cache-group cache capacity by the step (a-2) by considering the partitioned-cache as having one-to-one correspondence with the cache-group cache. This value is an estimated value of the number of cache hits in data corresponding to the partitioned-cache.

When an estimated value of the total number of cache hits in the cache-group cache is required, the sum of estimated values of the number of cache hits in corresponding partitioned-caches should be calculated.

When a plurality of cache-group caches correspond to one partitioned-cache, the number of cache hits is estimated as follows.

(b-1) With respect to reference to data corresponding to the partitioned-cache, the number of accesses corresponding to each cache-group cache is monitored. A weighting factor for each cache-group cache is calculated with the approximation that the number of accesses corresponding to the cache-group cache is proportional to the monitored value even in the case where the number of cache hits changes in accordance with change in cache allocation to the partitioned-cache. When the weighting factor for a cache-group cache becomes zero, the following calculation is not performed on such cache-group cache.

(b-2) The number of cache hits in each cache-group cache is estimated by considering each cache-group cache as having one-to-one correspondence with the partitioned-cache on the assumption that the designated cache capacity from the administrator or the like to the partitioned-cache in advance is allocated to the partitioned-cache and each cache-group cache has a capacity obtained by dividing the designated cache capacity (from the administrator or the like) to the cache group cache by the weighting factor calculated by the step (b-1).

(b-3) The weighting factor calculated by the step (b-1) is multiplied by the estimated value of the number of cache hits calculated by the step (b-2). This result is the estimated value of the number of cache hits in each cache-group cache with respect to data corresponding to the partitioned-cache can be obtained.

When an estimated value of the total number of cache hits in all the cache-group caches with respect to data corresponding to the partitioned-cache is required, the sum of the estimated values of the number of cache hits in corresponding cache-group caches is calculated.

When the partitioned-caches have multi-to-multi correspondence with the cache-group caches, calculation of a weighting factor for partitioned-cache or cache-group cache in each correspondence (the steps (b-1) and (a-1) (with weighting based on the weighting factor calculated by the step (b-1) at the time of grasping the number of accesses in accordance with each partitioned-cache)), division of the cache capacity of cache-group caches to partitioned-caches (the step (a-2)), and estimation of the number of cache hits based on the allocated cache capacity and correction of the estimated value of the number of cache hits based on the weighting (the steps (a-3), (b-2), and (b-3)) are executed in order. Further, the sum is calculated in accordance with the number of cache hits to be required.

In this estimating method, it is necessary to grasp the total number of times in reference to data in the computer and the distribution of the number of cache hits in each position in the virtual LRU management list 5000 in accordance with each partitioned-cache. In this embodiment, the virtual LRU management list 5000 is partitioned into M equal-size sections. The number of cache hits in each section is monitored by the DBMS 90 and stored in cache monitor information 510 contained in the DB management information 94. The DBMS 90 uses the cache monitor information 510 as information concerning the distribution of the number of cache hits in each position in the virtual LRU management list 5000.

When the LRU management list partitioned into sections in the aforementioned manner is used, the section to which data belongs can be grasped. In this case, estimation is performed on the basis of approximation that the rate of change in the number of cache hits in each section is uniform. However, it may be conceived that accuracy in the approximation is poor. Therefore, the upper and lower limits of the number of cache hits can be used by calculating these values on the assumption that the number of cache hits changes stepwise at end points of each section.

The DBMS 90 needs to grasp the number of accesses to a cache-group cache corresponding to each partitioned-cache. The DBMS 90 monitors the number of accesses to a corresponding file 202 in accordance with each DB storage region 224 and stores the number of accesses in file I/O monitor information 520 contained in the DB management information 94. The DBMS 90 executes estimation of the number of cache hits by using these values.

The structure of data held in each device or program will be described below.

Figure 4:
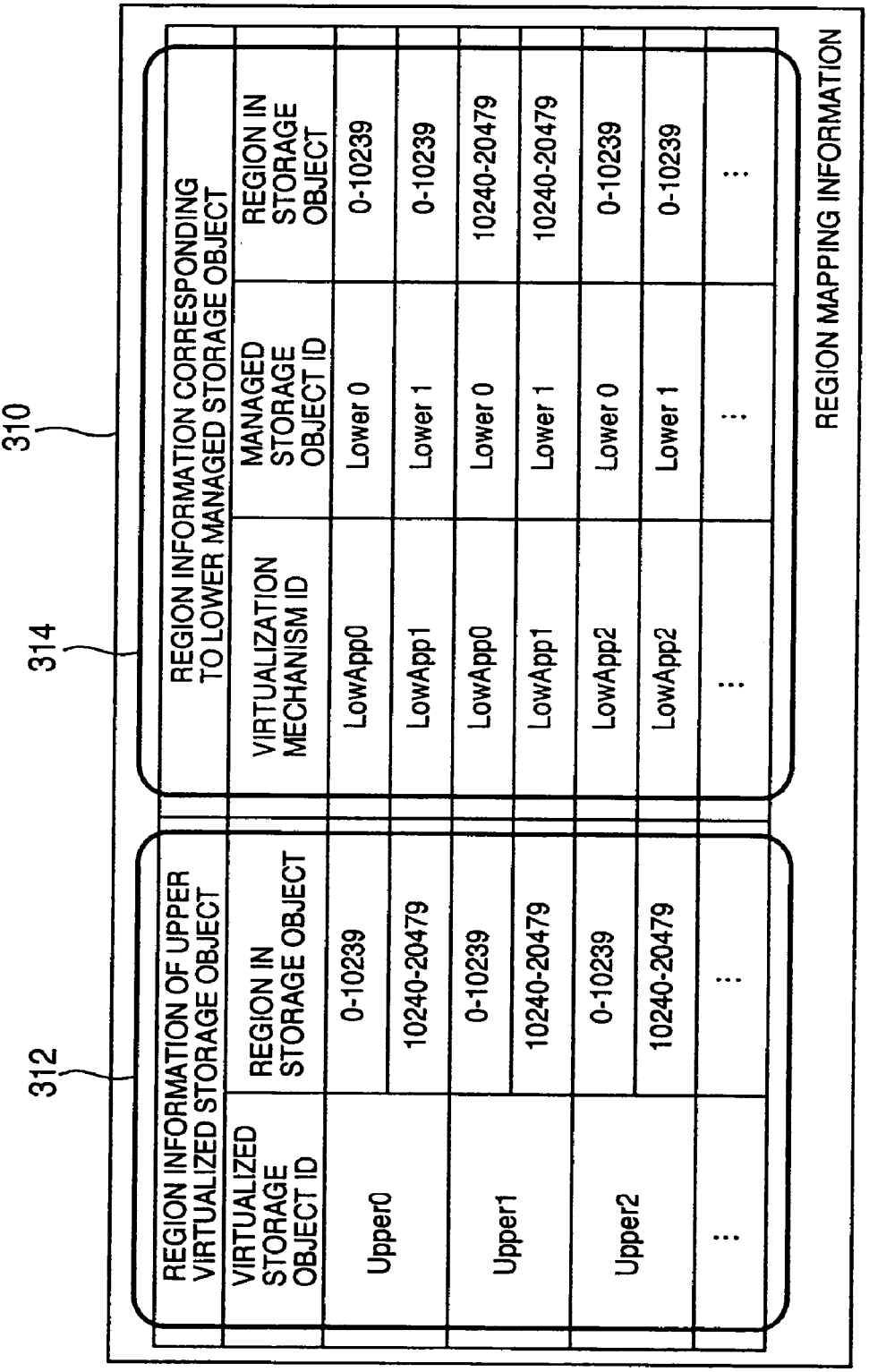
FIG. 4 is a table showing an example of data structure of region mapping information 310.

FIG. 4 is a table showing the data structure of the region mapping information 310. The region mapping information 310 is provided for holding correspondence between regions of virtualized storage objects provided by the virtualization mechanism and regions of managed storage objects used by the virtualization mechanism. The region mapping information 310 has an entry 312 and an entry 314 in accordance with each virtualized storage object provided by the virtualization mechanism. Information concerning regions of virtualized storage objects provided to the upper layer by the virtualization mechanism is registered in the entry 312. Specifically, the entry 312 has a sub entry for holding virtualized storage object IDs which are identifiers of virtualized storage objects, and a sub entry for indicating regions in the virtualized storage objects. Information concerning regions of managed storage objects in a lower layer corresponding to the entry 312 is registered in the entry 314. Specifically, the entry 314 has a sub entry for holding virtualization mechanism IDs which are identifiers of virtualization mechanisms providing managed storage objects, a sub entry for holding managed storage object IDs which are identifiers of managed storage objects, and a sub entry for indicating regions in the managed storage objects. However, the sub entry for holding virtualization mechanism IDs is not stored in the storage subsystem 40.

Figure 5:
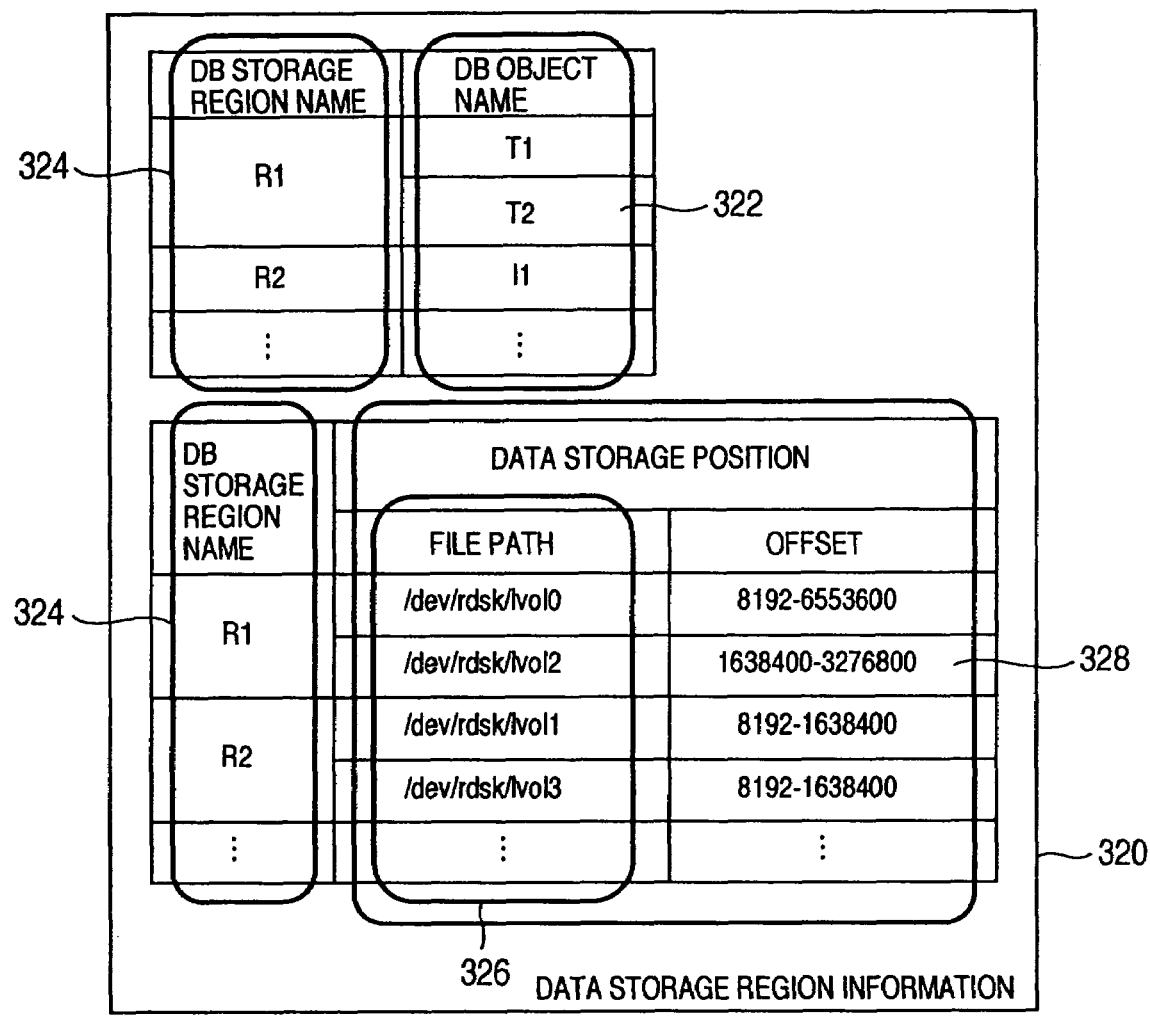
FIG. 5 is a table showing an example of data structure of data storage region information 320.

FIG. 5 is a table showing the data structure of the data storage region information 320. The data storage region information 320 contains two kinds of information used for managing the storage regions of objects 222 such as tables, indices, logs, etc. managed by the DBMS 90. One is information for managing DB storage regions 224 corresponding to the objects 222. This information has an entry for holding object names 322 which are names of the objects 222, and an entry for holding DB storage region names 324 which are names of the DB storage regions 224 for storing the objects 222. Pairs of these entries are provided in accordance with each DB storage region 224. Each object name 322 is determined as a unique name in the DBMS 90. If the same name in each DB is allowed in the DBMS 90, each DB object name 322 should contain the identifier of the DB.

The other information is information concerning files 202 corresponding to the DB storage regions 224. This information has an entry for holding DB storage region names 324, and an entry for holding data storage positions 328. The two entries are provided in accordance with each DB storage region 224. Each data storage position 328 is information for indicating the position of a file 202 in which a corresponding DB object 222 is stored. The data storage positions 328 has a sub entry for holding file paths 326 which are path names of files 202, and a sub entry for holding offsets indicating storage positions in the files 202.

FIG. 6 is a table showing the data structure of the partitioned-cache setting information 330. The partitioned-cache setting information 330 is management information used by the DBMS 90 in the case where the cache 94 is partitioned. The partitioned-cache setting information 330 has an entry for holding cache IDs 332 which are identifiers of storage regions of the partitioned cache 94, an entry for holding cache capacities 334 which are capacities of the cache allocated to the regions, an entry for holding storage region names 324 of corresponding DB storage regions 224, an entry for holding DB object names 322 of corresponding DB objects 222, and an entry for holding exclusive control modes 336. The five entries are provided in accordance with each partitioned-cache. As described above, the cache 94 is partitioned in accordance with DB objects 222 or DB storage regions 224. When corresponding cache regions are decided by the DB storage regions 224, invalid values are stored in the DB object names 322.

FIG. 7 is a table showing the data structure of the cache-group information 410. The cache-group information 410 is information used by each storage subsystem 40 for managing cache-groups. The cache-group information 410 has an entry for holding cache-group IDs 412 which are identifiers of cache-groups, an entry for holding cache capacities 334 allocated to the cache-groups, an entry for holding LU IDs 364 which are identifiers of LUs 208 belonging to the cache-groups, and an entry for holding control mode setting information 416. The four entries are provided in accordance with each cache-group.

An example of data structure of monitor information collected by the DBMS 90 and used for a process of changing (hereinafter also referred to as "tuning") cache allocation will be described below.

FIG. 8 is a table showing the data structure of the cache monitor information 510. The cache monitor information 510 is statistical information concerning whether data referred to by the DBMS 90 is hit in the cache 94 and concerning the data hit position of the virtual LRU management list 5000 in each partitioned-cache. The cache monitor information 510 has an entry for holding cache IDs 332 of partitioned-caches, an entry for holding cumulative numbers of times 514 which are cumulative numbers of times in reference to data corresponding to the partitioned-caches, and an entry for holding cumulative numbers of hits 516 which are cumulative numbers of hits in the partitioned-caches. The three entries are provided in accordance with each partitioned-cache. The entry for holding cumulative numbers of hits 516 has a sub entry for holding numbers of actual hits which are numbers of hits in the case where data actually stay in the partitioned-caches, and sub entries for holding numbers of hits in sections of the virtual LRU management list 5000 which is partitioned into M sections. In this embodiment, the M sections are numbered so serially that the smaller section number the section has, the more recently used data stays in the section. That is, the first section is a section in which most recently used data stays.

Figure 9:
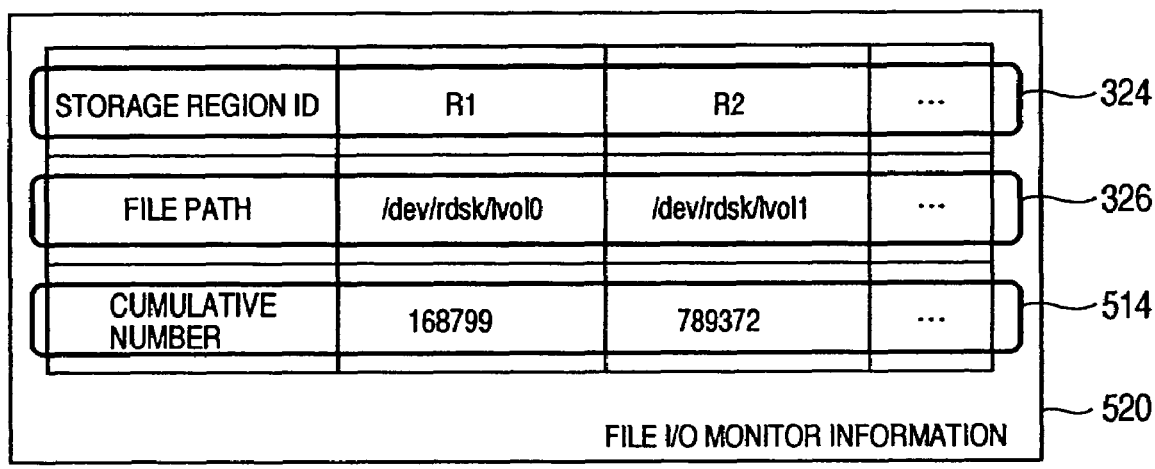
FIG. 9 is a table showing an example of data structure of file I/O monitor information 520.

FIG. 9 is a table showing the data structure of the file I/O monitor information 520. The file I/O monitor information 520 is statistical information concerning numbers of accesses to files 202 corresponding to DB storage regions 224. The file I/O monitor information 520 has an entry for holding DB storage region names 324 of DB storage regions 224, an entry for holding file paths 326 of files 202 corresponding to the DB storage regions 224, and an entry for holding cumulative numbers of accesses 514 which are cumulative numbers of accesses to the files 202 in corresponding data. The three entries are provided in accordance with each DB storage region 224.

A cache managing procedure in this embodiment will be described below.

First, a process in which the administrator initializes cache-groups in the storage subsystem 40 will be described.

Figure 10:
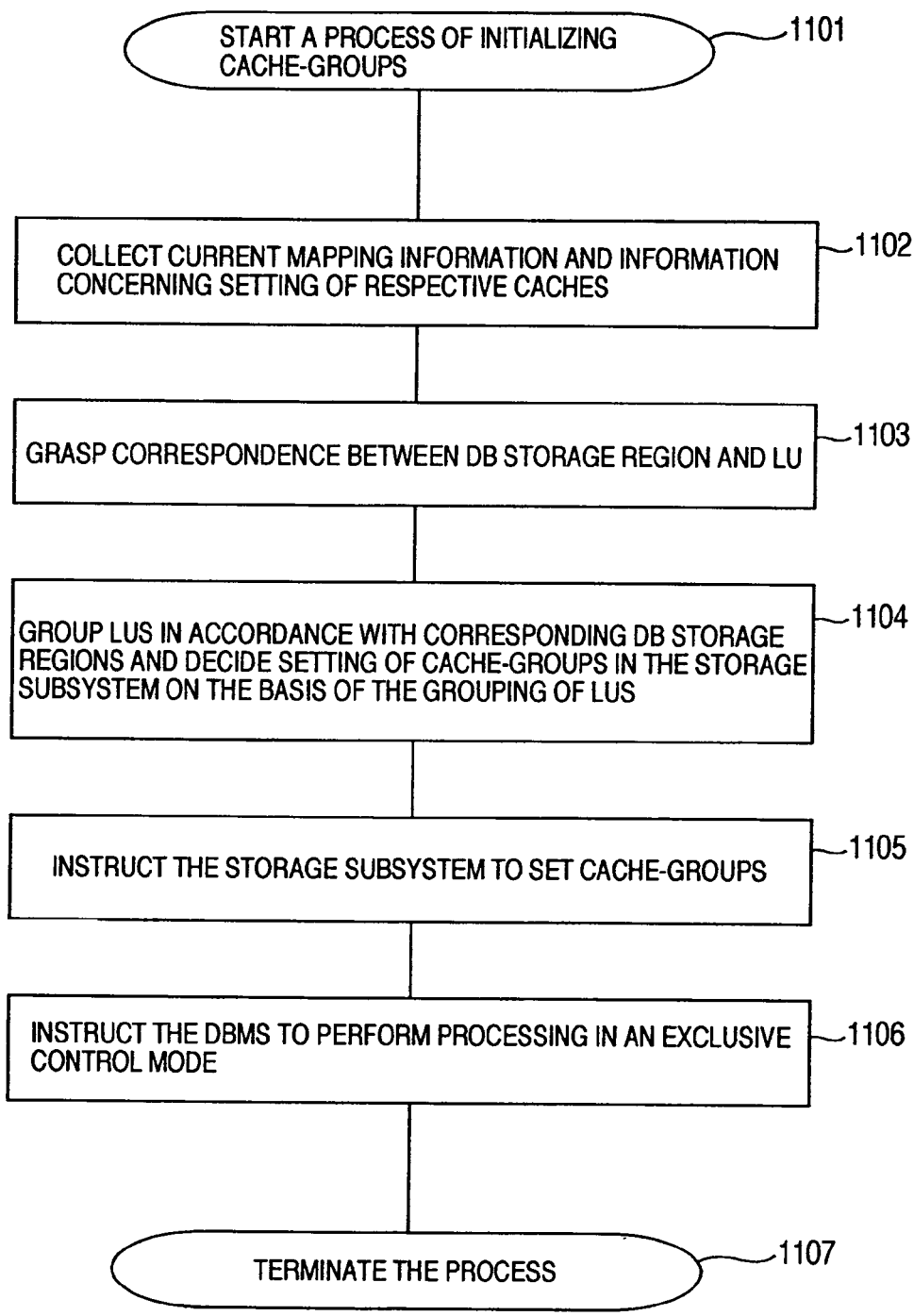
FIG. 10 is a flow chart showing an example of processing flow of a process for initializing cache-groups.

FIG. 10 is a flow chart showing an example of processing flow of a process for initializing cache-groups. This process sets cache-groups on the basis of setting of partitioned-caches of the DBMS 90 designated by the administrator or the like. The management server 120 executes the cache management program 140 to carry out this process. It is assumed that definition of DBs and setting of DB storage regions 224 (inclusive of correspondence with storage regions on LUs 208) are completed before this process is carried out.

Furthermore, automation up to decision of the cache partitioning method in the DBMS 90 can be achieved when partitioned-caches are allocated independently in accordance with tables and indices set in the DBMS 90. In this case, the DBMS 90 makes a decision automatically on the basis of the definition of the DB so that DB storage regions 224 are one by one allocated in accordance with tables, indices and logs, and that any one of a table, a index and a log is stored in one LU 208.

Upon reception of an instruction from the administrator, the management server 120 receives the identifier of the DBMS 90 (hereinafter referred to as "target" DBMS 90) having setting of partitioned-caches as the base of setting of cache-groups from the administrator (step 1101).

Next, the management server 120 collects region mapping information 310 managed by the storage subsystem 40, the volume manager 78 and the filesystem 80 and data storage region information 320 managed by the DBMS 90 designated by the identifier obtained by step 1101 and updates collective mapping information stored in the cache management information 142 to a latest state. The management server 120 acquires cache-group information 410 managed by the storage subsystem 40 and partitioned-cache setting information 330 from the target DBMS 90 as current cache setting information. When setting of partitioned-caches in the DBMS 90 is performed through the management server 120 and information concerning the setting of partitioned-caches remains in the management server, acquisition of partitioned-cache setting information 330 can be omitted by using the information still existing in the server (step 1102).

Next, the management server 120 finds all LUs 208 corresponding to DB storage regions 224 in the target DBMS 90 by using the updated collective mapping information. The management server 120 finds the cache-group to which each found LU 208 belongs, on the basis of the cache-group information 410 acquired in the step 1102. The management server 120 checks whether the cache-group to which each found LU 208 belongs is a free cache-group. When the found LU 208 does not belong to a free cache-group, the cache-group to which such LU 208 belongs is not changed and the management server 120 notifies to the administrator that the cache-group to which such LU 208 belongs cannot be changed (step 1103).

In each storage subsystem 40, the management server 120 classifies LUs 208 belonging to a free cache-group as found in the step 1103, into groups by DB storage regions 224. In this case, when one LU 208 corresponds to a plurality of DB storage regions 224 in a certain storage subsystem 40, the management server 120 sets one group of all LUs 208 which correspond to any DB storage regions 224 corresponding to such LU 208 in the storage subsystem 40 as a new cache-group (step 1104).

The management server 120 instructs a corresponding storage subsystem 40 to set cache-groups so that setting of cache-groups decided in the step 1104 can be achieved. In the setting of cache-groups decided in the step 1104, when all cache-groups corresponding to a certain DB storage region 224 are generated newly by the instructions in this step or their control mode has been already in the exclusive mode, the management server 120 instructs a corresponding storage subsystem 40 to set the control mode of the newly generated cache-groups corresponding to the DB storage region 224 in this state to the exclusive mode just after generation of the cache-groups (step 1105).

Then, the management server 120 directs the target DBMS 90 that partitioned-caches in which all corresponding cache-groups are set to the exclusive mode in the step 1105 or the control mode has been already in the exclusive mode before the start of this process should be processed in an exclusive control mode, that is, the value of corresponding exclusive control mode setting information 334 should be set to "On" (step 1106). Then, the management server 120 completes the initializing process (step 1107).

By the aforementioned process, partitioned-caches are associated with cache-group caches on the basis of correspondence between DB storage regions and LUs. That is, this means that partitioned-caches and cache-group caches associated with them can be separated in accordance with the kinds of data when DB storage regions are used individually in accordance with the kinds of DB objects. Accordingly, the administrator or the like can designate exclusive use of the cache memory for only specific data (or specific DB storage region).

Next, a cache allocation changing procedure in this embodiment will be described. For example, change of cache allocation is performed on the following situation. (1) Just after the construction of the computer system or when some components of processing executed in the computer system are added, deleted or modified, cache allocations are tuned to be optimized to the current set of processing. In this case, monitor information is collected for a predetermined period after the administrator performs the constructing or modifying process. After the collection of monitor information, the cache allocation changing process starts on the basis of the administrator's instruction. (2) When a performance problem occurs (particularly in an application program using the DB) (i.e. when performance designated in advance cannot be maintained or performance degradation is detected), cache allocations are tuned to attain improvement in performance. In this case, the performance problem is detected by a performance monitor program or the like, so that the cache allocation changing process starts on the basis of the instruction given from the administrator notified of the detection of the performance problem. Information which has been already acquired (both before and after the occurrence of the performance problem) is used as the monitor information.

Figure 11:
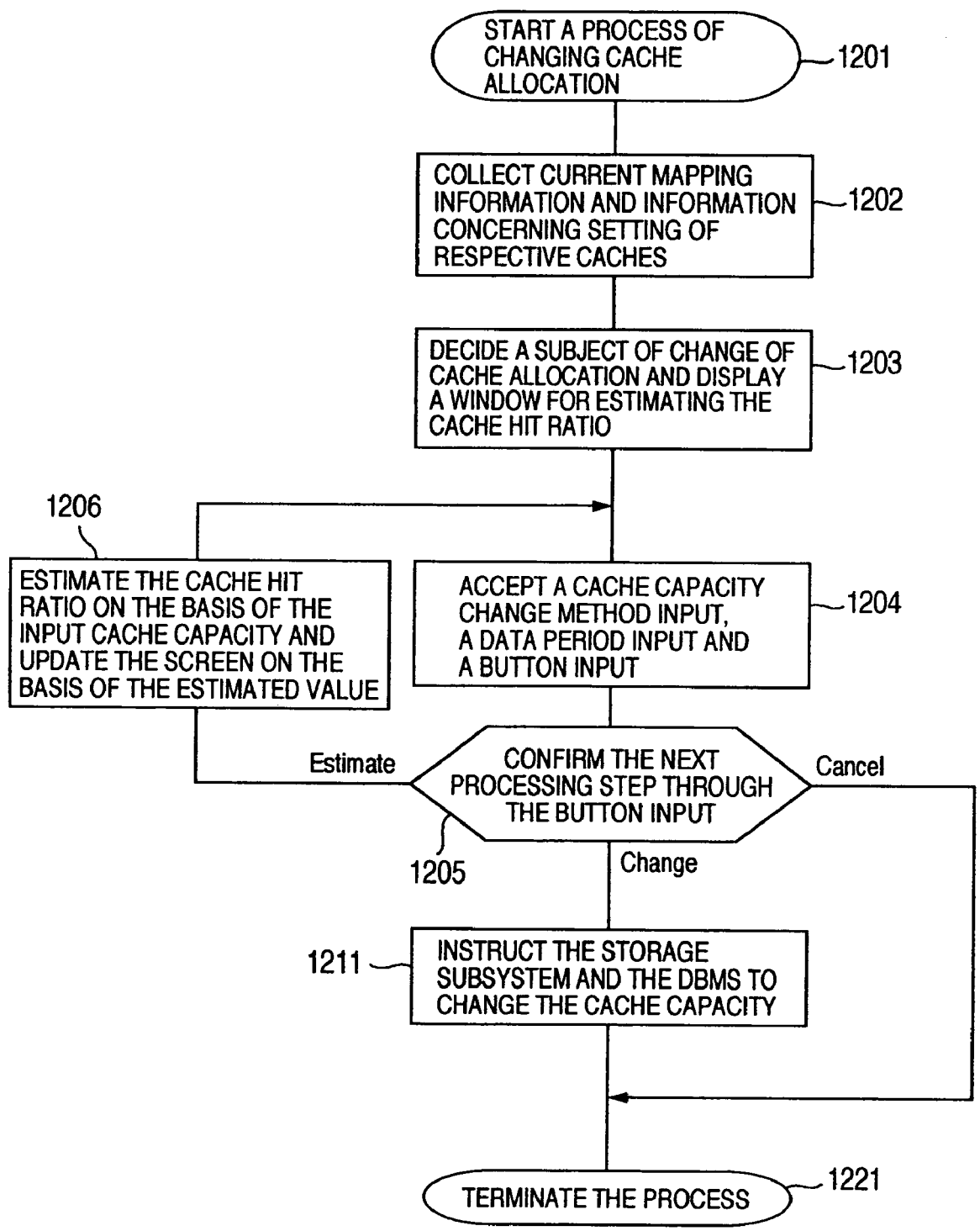
FIG. 11 is a flow chart showing an example of processing flow of a process for changing cache allocation.

FIG. 11 is a flow chart showing an example of processing flow of the cache allocation changing process. In this process, the management server 120 instructs the DBMS 90 and the storage subsystem 40 to change cache allocation by using estimation of change in cache hit ratio at the time of changing cache allocation on the basis of the monitor information. The management server 120 executes the cache management program 140 to thereby carry out this process.

Before this process is carried out, the management server 120 acquires cache monitor information 510 and file I/O monitor information 520 from the DBMS 90 periodically so that the number of times in reference to data, the number of hits and the number of accesses to each cache-group in a certain period of time are grasped as a difference between data at two points of time and held in the cache management information 142. If necessary, the management server 120 acquires the cumulative value of the number of accesses and the cumulative value of the number of cache hits in each cache-group cache from the storage subsystem 40, calculates the number of cache hits in the same manner and holds them.

Upon reception of the administrator's instruction (step 1201), the management server 120 first collects region mapping information 310 managed by the storage subsystem 40, the volume manager 78 and the filesystem 80 and data storage region information 320 managed by the DBMS 90 and updates collective mapping information stored in the cache management information 142 to a latest state. The management server 120 collects cache-group information 410 managed by the storage subsystem 40 and partitioned-cache setting information 330 of the DBMS 90 as current cache setting information (step 1202).

Then, the management server 120 displays a window for deciding a subject of change of cache allocation on a display screen 114 of a management terminal 110 so that the administrator can designate a partitioned-cache as a subject of change of cache allocation. Then, the management server 120 displays a cache allocation changing window 710 for the designated subject of change of cache allocation on the display screen 114 (step 1203).

Figure 12:
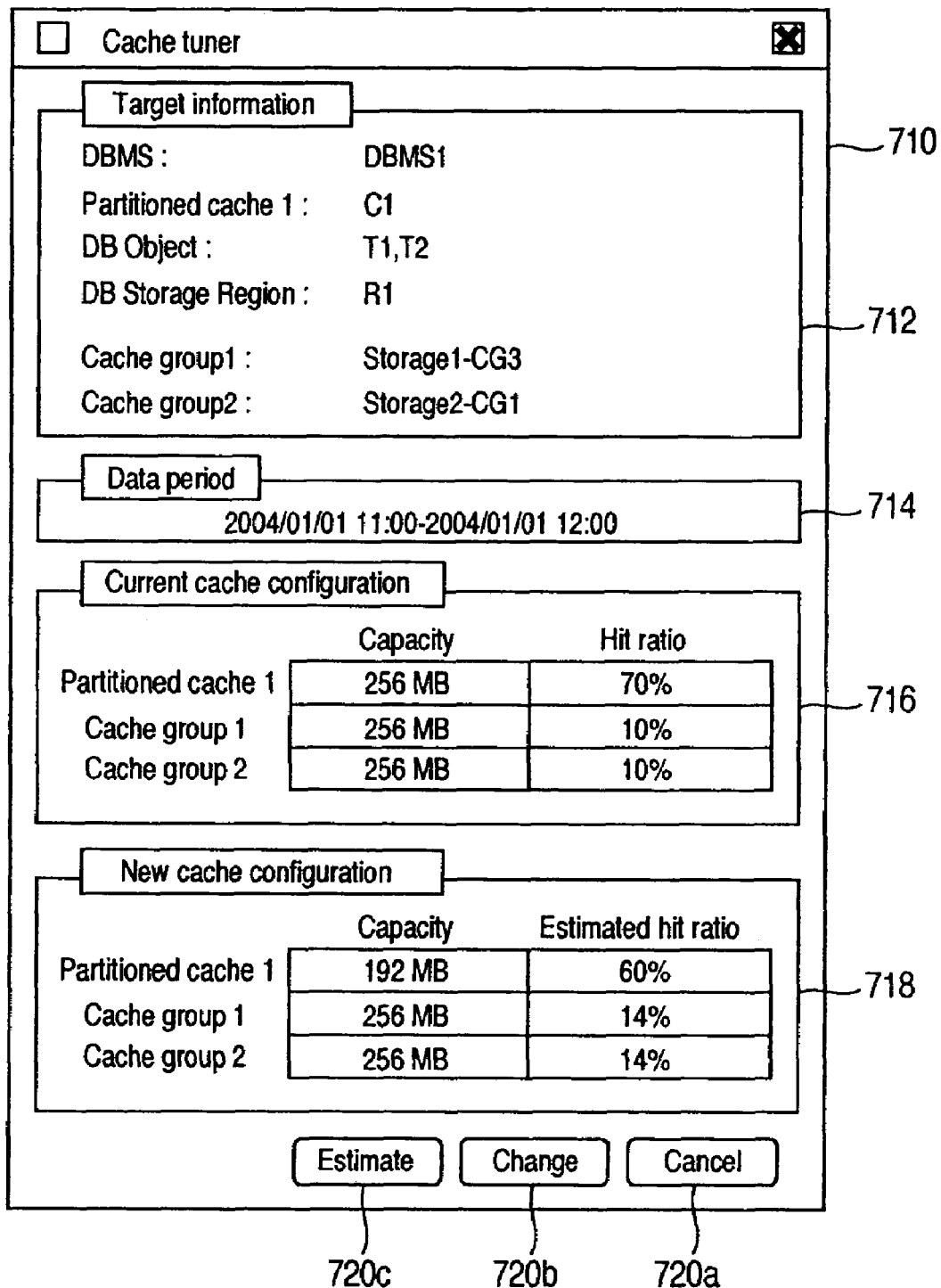
FIG. 12 is a view showing a cache allocation change window 710.

FIG. 12 is a view showing an example of the cache allocation changing window 710 displayed on the display screen 114. The cache allocation changing window 710 includes a target information region 712 for displaying information concerning a DB storage region 224 as a subject of change of cache allocation and corresponding cache-groups in the storage subsystem 40, a data period region 714 for displaying the period of monitor data for calculating the cache hit ratio and accepting an input to alter the period, a current cache configuration region 716 for displaying the current cache configuration and cache hit ratios therein, a new cache configuration region 718 for accepting an input of new cache configuration and displaying cache hit ratios estimated on the basis of the new cache configuration, and buttons 720a, 720b and 720c for accepting instructions for performing the next operation of the cache allocation changing window 710.

The management server 120 displays information of all partitioned caches and cache-groups corresponding to the designated subject of change of cache allocation in the current cache configuration region 716 and the new cache configuration region 718 and accepts an input from the administrator through the new cache configuration region 718. Although the cache hit ratios displayed in the current cache configuration region 716 are preferably calculated from the actually measured values, they may be calculated from values estimated by the cache hit number estimating method using the aforementioned virtual LRU management list 5000. When the cache allocation changing window 710 is displayed initially, the management server 120 sets values based on the current configuration as initial values in the new cache configuration region 718 and displays the window. The cache hit ratios displayed are calculated by use of data in the data period displayed in the data period region 714. Initial values corresponding to the latest several hours or the like are set in the data period region 714 and can be changed when an input is accepted from the administrator.

Referring back to the flow chart of FIG. 11, the management server 120 accepts the inputs for designating the change of the data period for estimation of the cache hit ratios through the data period region 714, designating the change method of cache allocation through the new cache configuration region 718, or designating the next operation of the cache allocation changing window 710 through the buttons 720a, 720b, and 720c, when the value is changed by input, the cache allocation changing window 710 is displayed so that change of the value can be recognized easily (step 1204). When, for example, the cache allocation changing method is inputted, the color of the input value in the new cache configuration region 718 may be changed.

When there is a button input, the management server 120 judges the next operation. When the button 720a for canceling processing is inputted, the management server carries out the step 1221. When the button 720b for changing the cache configuration to a designated configuration is inputted, the management server 120 carries out the step 1211. When the button 720c for estimating the cache hit ratios with the cache configuration modified by the inputs is inputted, the management server 120 carries out the step 1206. Furthermore, when the button 720b is inputted before the step 1206 is carried out with the modified configuration by the inputs, the management server 120 may perform control to return the current position of the process to the step 1204 (step 1205).

The management server 120 executes the aforementioned cache hit number estimating process by using data in the data period set in the data period region 714 in accordance with the cache allocation modified by the input and calculates the cache hit ratios on the basis of the estimated values. In this case, the upper and lower limits of the number of cache hits may be calculated simultaneously. Then, the management server 120 updates the values of the cache hit ratios in the new cache configuration region 718 to calculated values and the current position of the process goes back to the step 1204 (step 1206).

Then, the management server 120 instructs the DBMS 90 and the storage subsystem 40 to change cache allocation to partitioned caches and cache-group caches in accordance with the cache allocation modified by the inputs (step 1211). Then, the cache allocation changing window 710 is closed and the process is completed (step 1221).

Although only the case where the cache management program 140 is executed on the management server 120 is explained up to this point, the cache management program 140 may be executed on any one of the servers 70 and storage subsystems 40. In this case, the cache management program 140 is stored in the HDD 16 of each server 70 and the cache management program 140 is executed by the CPU 12 after read onto the memory 14. The cache management program 140 is stored in the ROM region of the memory 14 and executed by the CPU 12 after transferred to the RAM region of the memory 14 in the storage subsystem 40. Processing achieved by the cache management program 140 can be achieved as part of another program. Particularly, it is conceived that the cache management program 140 is incorporated in the DBMS 90 which maintains a large number of necessary information. In this case, the DBMS 90 may carry out processing according to this invention by collecting only information concerning objects managed by the DBMS 90.

Figure 13:
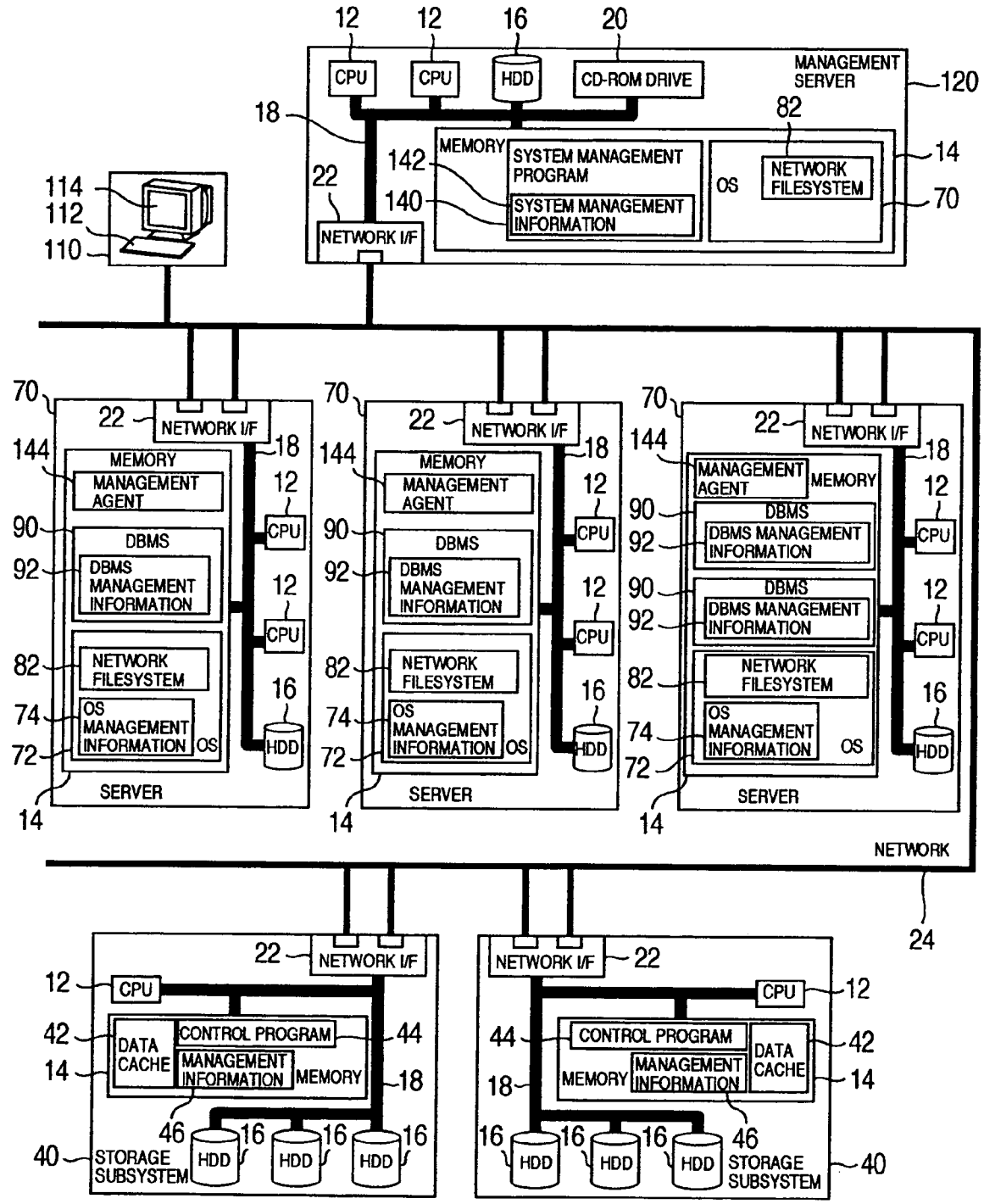
FIG. 13 is a diagram showing another example of configuration of the computer system according to Embodiment 1 in the case where each storage subsystem 40 provides files 202 to an external device.

Up to this point, the case where each storage subsystem 40 provides LUs 208 accessed via the I/O path 34 to external devices. Each storage subsystem 40 however may provide files 202 accessed via the network 24 by use of a network filesystem protocol to external devices. FIG. 13 is a diagram showing the configuration of the computer system according to Embodiment 1 in the case where each storage subsystem 40 provides files 202 to external devices. The following difference exists between this case and the aforementioned case.

Each server 70 need not include any I/O path I/F 32. The OS 72 has a network filesystem 82 so that files 202 provided by external devices can be accessed via the network I/F 22 and the network 24 by use of a network filesystem protocol. However, the OS 72 need not have any volume manager 78 and any filesystem 80. The network filesystem has region mapping information 310 contained in OS management information 74. When a file 202 recognized by the DBMS 90 and a file 202 provided by the storage subsystem 40 have correspondence in accordance with a certain rule, only information of the rule for determining the correspondence may be held in the OS management information 74. In this case, the cache management program 140 acquires information for determining the correspondence, generates region mapping information 310 on the basis of the acquired information and stores them in collective mapping information.

Further, each storage subsystem 40 need not include any I/O path I/F 32. The control program 44 of the storage subsystem 40 executes processing provided by the filesystem 80. Specifically, files 202 obtained by virtualizing the storage regions of LUs 208 held in the storage subsystem 40 are provided to an external devices by the control program 44. The control program 44 interprets at least one network filesystem protocol and carries out a file access process requested from external devices via the network 24 and the network I/F 22 by use of the protocol. In each storage subsystem 40, members of a cache-group are managed not in accordance with LUs 208 but in accordance with files 202.

With respect to mapping of data, the layer of files 202 and all layers below the layer of files 202 in the data mapping hierarchical configuration shown in FIG. 2 should be provided by the storage subsystems 40. Accordingly, each server 70 should access files 202 on the storage subsystems 40 by using the network filesystem 82 contained in the OS 72.

When each storage subsystem 40 provides files 202 to external devices, in this embodiment, a part of the processing or the like explained with correspondence to the LUs 208 should be substituted for are with correspondence to the files 202 on the storage subsystems 40.

Embodiment 1 has shown the case where the DBMS 90 manages the virtual LRU management list 5000 and acquires information concerning the distribution of the number of cache hits in each position in the virtual LRU management list 5000. Embodiment 2 is configured as follows. Each of DBMS 90 and the storage subsystem 40 acquires two kinds of statistical information concerning the number of cache hits on the basis of LRU management lists managed by itself respectively and information concerning the distribution of the number of cache hits in each position of the virtual LRU management list 5000 is generated on the basis of these statistical information obtained by them. Because a large part of Embodiment 2 is common to Embodiment 1, only the point of difference between Embodiments 1 and 2 will be described below.

The DBMS 90 acquires cache monitor information 510 in the same manner as in Embodiment 1. In Embodiment 1, the number of hits is acquired even for a portion of the virtual cache storage region of the cache 94 exceeding the capacity actually allocated to partitioned-caches. On the other hand, in Embodiment 2, only the portion actually allocated to partitioned-caches is used. Accordingly, Embodiment 2 can be achieved as long as the number of hits in only the portion actually allocated to the partitioned-caches can be acquired.

In Embodiment 2, each storage subsystem 40 acquires cache operation monitor information having the same format as that of the cache monitor information 510. In the cache monitor information 510, the number of hits is measured in accordance with each partitioned-cache. In the storage subsystem 40, the number of hits is measured in accordance with each cache-group cache. Further, in the storage subsystem 40, statistical information concerning the number of hits in a portion of the virtual cache storage region of the data cache 42 exceeding the capacity actually allocated to the cache-groups is also acquired in the same manner as in the cache monitor information 510 in Embodiment 1 in order to cope with increase in cache allocation.

Figure 14:
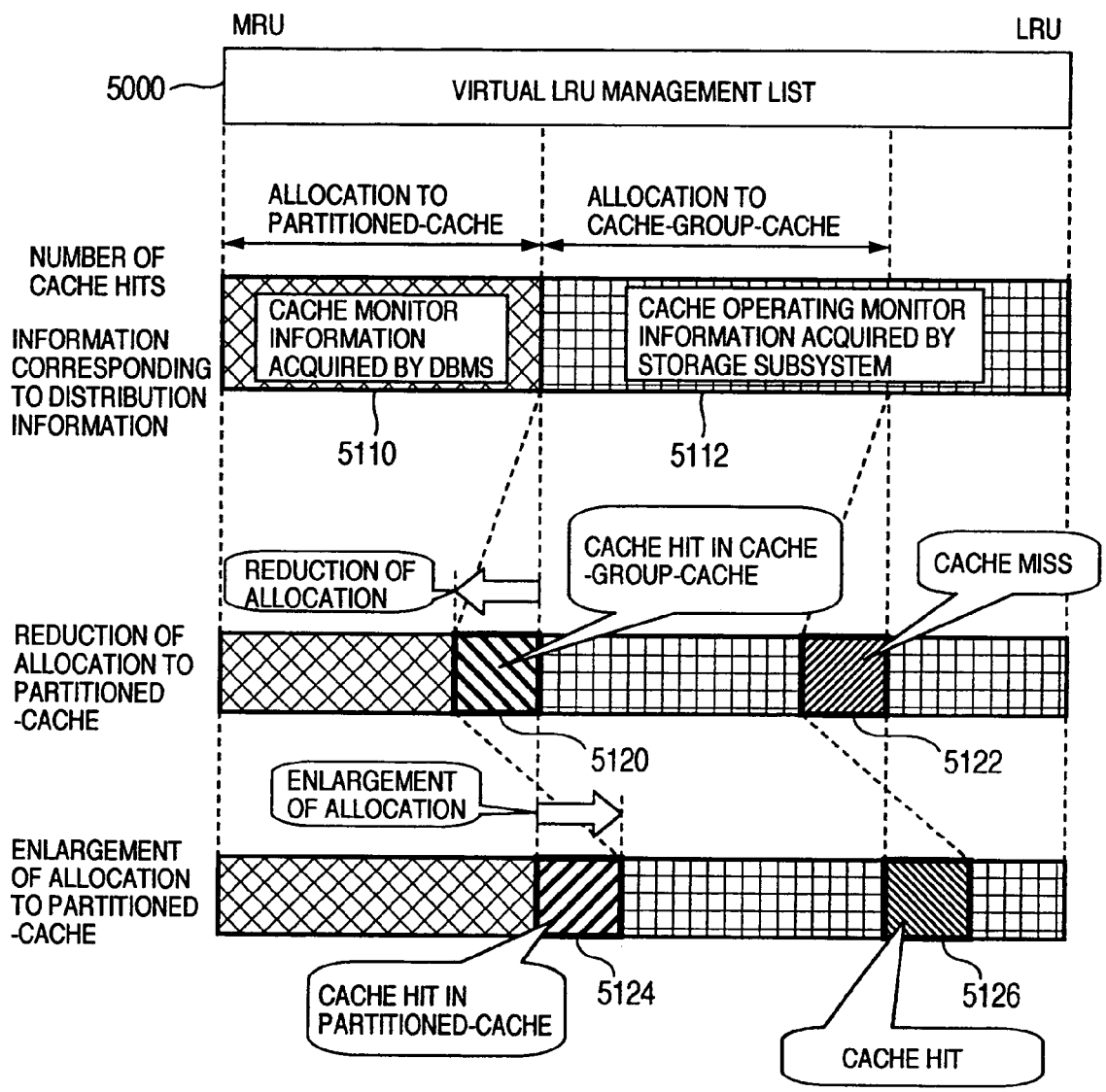
FIG. 14 is a diagram showing an example of correspondence between acquired cache operating monitor information and cache hit number distribution information in Embodiment 2 of the invention.

FIG. 14 is a diagram showing an example of correspondence among cache hit number distribution information in positions of the virtual LRU management list 5000 for estimation of the number of cache hits in Embodiment 2, cache monitor information 510 acquired by the DBMS 90 and cache operation monitor information acquired by the storage subsystem 40. Assume now the most basic case where partitioned-caches have one-to-one correspondence with cache-group caches. A portion of the cache hit number distribution information (region 5110) which is located at the MRU end of the virtual LRU management list 5000 and has the size corresponding to the cache capacity allocated to the partitioned-caches corresponds to the cache monitor information 510. A portion (region 5112) following the region 5110 corresponds to the cache operation monitor information acquired by the storage subsystem 40.

When cache allocation to partitioned-caches is reduced, the number of cache hits corresponding to a portion (i.e. region 5120) extending from the LRU end of the cache monitor information 510 and corresponding to the reduced amount in allocation should be treated as ones being hit in the cache-group caches. The number of cache hits corresponding to a portion (i.e. region 5122) extending toward the MRU end from the LRU end of the portion actually allocated to the cache-group caches in cache-group cache operation monitor information and corresponding to the reduced amount in allocation to the partitioned-caches should be treated as ones being missed in the cache-group caches.

On the other hand, when cache allocation to partitioned-caches is enlarged, the number of cache hits corresponding to a portion (i.e. region 5124) extending from the MRU end of the cache-group cache operation monitor information and corresponding to the enlarged amount of allocation to the partitioned-caches should be treated as ones being hit in the partitioned-caches. The number of cache hits corresponding to a portion (i.e. region 5126) extending toward the LRU and from the LRU end of the portion actually allocated to the cache-group caches in the cache-group cache operation monitor information and corresponding to the enlarged amount of allocation to the partitioned-caches should be treated as ones being hit in the cache-group caches.

When a plurality of partitioned-caches correspond to one cache-group cache, change in the number of hits is estimated as follows.

(c-1) The number of accesses from each partitioned-cache to the target cache-group cache is grasped on the basis of the file I/O monitor information 520, so that a weighting factor for each partitioned-cache is calculated (with the approximation that the weighting factor does not changes regardless of change in cache allocation to the partitioned-cache). When the weighting factor for a partitioned-cache becomes zero, the calculation in the step (c-2) is not executed on such partitioned-cache.

(c-2) First, when allocation to a certain partitioned-cache is changed, change in the number of cache hits is estimated in the same manner as in the case where partitioned-caches have one-to-one correspondence with cache-group caches on the assumption that change in cache allocation to the cache-group cache can be obtained by dividing change in allocation to the partitioned-cache by the weighting factor calculated in the step (c-1). A value obtained by multiplying the weighting factor calculated in the step (c-1) by the result is an estimated value of change in the number of cache hits in the cache-group cache corresponding to the partitioned-cache. When change in the total number of cache hits in the cache-group cache needs to be obtained, the sum of change in the number of hits corresponding to the partitioned-caches should be calculated.

(c-3) The following estimation is calculated independently in accordance with each partitioned-cache. When allocation to a partitioned-cache is reduced, reduction in the number of hits is estimated on the basis of the cache monitor information 510 on the assumption that the specified amount of the cache allocation is reduced from the partitioned-cache. When allocation to a partitioned-cache is enlarged, increase in the number of hits in the partitioned-cache is estimated as the number of hits considered to be shifted to the partitioned-cache in the cache-group cache in the step (c-2).

When a plurality of cache-group caches correspond to one partitioned-cache, change in the number of hits is estimated as follows.

(d-1) The number of accesses to each cache-group cache is grasped from the file I/O monitor information 520 with respect to reference to data corresponding to the partitioned-cache. A weighting factor for each cache-group cache is calculated on the basis of the number of accesses (with the approximation that the weighting factor does not change regardless of change in cache allocation to the partitioned-cache).

(d-2) When allocation to the partitioned-cache is changed, change in the number of cache hits is estimated in the same manner as in the case where partitioned caches have one-to-one correspondence with cache-group caches on the assumption that a value obtained by multiplying change in allocation to the partitioned-cache by the weighting factor calculated in the step (d-1) should be change in allocation to each cache-group cache. The estimated value becomes one estimated value of change in the number of cache hits in each cache-group cache.

(d-3) When allocation to the partitioned-cache is reduced, reduction in the number of hits is estimated on the basis of the cache monitor information 510 on the assumption that the specified amount of the cache allocation is reduced from the partitioned-cache. When allocation to the partitioned-cache is enlarged, the sum of the numbers of hits considered to be shifted to the partitioned-cache in each cache-group cache in the step (d-2) becomes the estimated value of increase in the number of hits in the partitioned-cache.

When partitioned-caches have multi-to-multi correspondence with cache-group caches, calculation of the weighting factor for each partitioned-cache or cache-group cache in each correspondence (the steps (c-1) and (d-1) simultaneously), distribution of change in each partitioned-cache among cache-group caches (the step (d-2)), calculation of change in the number of cache hits in each cache-group cache on the basis of change in the designated partitioned-cache (the step (c-2)) and calculation of change in the number of cache hits in the partitioned-cache (the steps (c-3) and (d-3) simultaneously) are executed in order.

According to the invention, performance of access to each storage subsystem can be improved.

When cache allocation in the storage subsystem is changed to tune performance, the effect due to change in cache allocation can be estimated easily. Accordingly, turning of cache allocation can be made easily, so that the cost for managing performance can be reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:

computers on which a plurality of programs operate respectively;

storage subsystems connected to said computers and provided for storing data sent from said computers, each storage subsystem having a plurality of logical units; and a management device connected to said computers and said storage subsystems, wherein each of said computers includes a first cache memory that is partitioned into one or more partitioned cache regions on the basis of the kinds of data managed by programs operating on said each of said computers, wherein each of said storage subsystems includes a second cache memory, wherein said management device acquires information concerning said programs from one of said computers, acquires information concerning mapping of data between said one of said computers and a corresponding one of said storage subsystems, decides a partitioning of said second cache memory in said corresponding storage subsystem by using said information concerning said programs and said information concerning mapping of said data, and instructs said corresponding storage subsystem to set partitioning of said second cache memory in accordance with said decided partitioning, wherein said partitioned cache regions of said first cache memory have one-to-one correspondence with partitioned regions of said second cache memory, wherein each one-to-one corresponding partitioned cache region of said first cache memory and partitioned region of said second cache memory correspond to the same one or more logical units.

2. A computer system comprising:

computers on which a plurality of programs operate respectively;

storage subsystems connected to said computers and provided for storing data sent from said computers, each storage subsystem having a plurality of logical units; and a management device connected to said computers and said storage subsystems, wherein each of said computers includes a first cache memory that is partitioned into one or more partitioned cache regions on the basis of management units for storage region management used by said programs operating on said each of said computers, wherein each of said storage subsystems includes a second cache memory, wherein said management device acquires information concerning said programs from one of said computers, acquires information concerning mapping of data between said one of said computers and a corresponding one of said storage subsystems, decides a partitioning of said second cache memory in said corresponding storage subsystem by using said information concerning said programs and said information concerning mapping of said data, and instructs said corresponding storage subsystem to set partitioning of said second cache memory in accordance with said decided partitioning, wherein said partitioned cache regions of said first cache memory have one-to-one correspondence with partitioned regions of said second cache memory, wherein each one-to-one corresponding partitioned cache region of said first cache memory and partitioned region of said second cache memory correspond to the same one or more logical units.

3. A computer system according to claim 1, wherein said management device classifies a storage region of each storage subsystem into groups by the kinds of data managed by said programs on the basis of said information concerning mapping, and decides a partitioning of said storage region of said second cache memory in accordance with said storage region groups.

4. A computer system according to claim 2, wherein said management device classifies a storage region of each storage subsystem into groups by storage regions for storing said management units for storage region management on the basis of said information concerning mapping, and decides a partitioning of said storage region of said second cache memory in accordance with said storage region groups.

5. A computer system according to claim 3, wherein said management device stores correspondence so that first storage regions allocated to said first cache memory partitioned are associated with second storage regions of said second cache memory allocated to said groups, and instructs said computers and said storage subsystems to provide a predetermined mode that is common to said first and second storage regions.

6. A computer system according to claim 4, wherein said management device stores correspondence so that first storage regions allocated to said first cache memory partitioned are associated with second storage regions of said second cache memory allocated to said groups, and instructs said computers and said storage subsystems to provide a predetermined mode that is common to said first and second storage regions.

7. A computer system according to claim 5, wherein said predetermined mode is a mode in which when each computer deletes data from said first storage regions, said computer instructs a corresponding storage subsystem to hold the deleted data in said second storage regions and in which when each computer reads data from said second storage regions, said storage subsystem deletes the read data from said second storage regions.

8. A computer system according to claim 7, wherein said management device receives information concerning the quantity of change in storage capacity of said first storage regions or said second storage regions, receives information concerning cache hit ratios of said first storage regions and said second storage regions from said computers and predicts the cache hit ratios of said first storage regions and said second storage regions on the basis of said information concerning the quantity of change and said information concerning the cache hit ratios when the capacity of said first storage regions or said second storage regions is actually changed on the basis of the quantity of change.

9. A computer system according to claim 8, wherein said management device sends an instruction to said computers or said storage subsystems to change The capacity of said first storage regions or said second storage regions on the basis of the received quantity of change.

10. A computer system according to claim 9, wherein said management device uses said first storage regions and said second storage regions as one virtual storage region and calculates cache hit ratios in said virtual storage region to thereby predict the cache hit ratios of said first storage regions and said second storage regions.

11. A computer system according to claim 10, wherein each of said computers acquires cache hit number distribution information which is statistical information concerning positions in cache management information at the time of access to data in said first storage regions, wherein said information concerning cache hit ratios is said cache hit number distribution information, and wherein said management device calculates estimated values of the number of cache hits in said second storage regions of said storage subsystems by using said cache hit number distribution information.

12. A computer system according to claim 10, wherein each of said storage subsystems collects second cache hit number distribution information in said second storage regions, and wherein said management device acquires said second cache hit number distribution information from said storage subsystem and predicts the cache hit ratios of said first and second storage regions.

13. A cache memory management program embodied on a computer-readable medium for a computer system including computers, each computer having a first cache memory, storage subsystems each provided for storing data of application programs executing on said computers and having a second cache memory, and a management device connected to said computers and said storage subsystems, comprising the steps of:

acquiring cache hit number distribution information concerning said first and second cache memories, cache hit number distribution information for said first cache being collected by said computers and cache hit number distribution information for said second cache being collected by said storage subsystems, said first cache of each computer being partitioned on the basis of the kinds of data managed by application programs operating on said each computer;

acquiring information concerning a cache partitioning from said computers and said storage subsystems;

acquiring information concerning mapping of data from said computers and said storage subsystems;

acquiring an expected quantity of change in cache allocation for said first or second cache memory; and calculating an estimated value of the number of cache hits in said second cache memory in each storage subsystem at the time of change in cache allocation in said computer system by using said information concerning said partitioning, said information concerning mapping and said expected quantity and outputting said estimated value.

14. A cache memory management program according to claim 13, wherein said cache memory management program is executed by any of said computers.

15. A cache memory management program embodied on a computer-readable medium for a computer system including computers, each computer having a first cache memory, storage subsystems each provided for storing data of application programs executing on said computers and having a second cache memory, and a management device connected to said computers and said storage subsystems, comprising the steps of:

acquiring cache hit number distribution information concerning said first and second cache memories, cache hit number distribution information for said first cache being collected by said computers and cache hit number distribution information for said second cache being collected by said storage subsystems, said first cache of each computer being partitioned on the basis of management units for storage region management used by said application programs operating on said each computer;

acquiring information concerning a cache partitioning from said computers and said storage subsystems;

acquiring information concerning mapping of data from said computers and said storage subsystems;

acquiring an expected quantity of change in cache allocation for said first or second cache memory; and calculating an estimated value of the number of cache hits in said second cache memory in each storage subsystem at the time of change in cache allocation in said computer system by using said information concerning said partitioning, said information concerning mapping and said expected quantity and outputting said estimated value.

16. A cache memory management program according to claim 15, wherein said cache memory management program is executed by any of said computers.

* * * * *